United States Patent
Zheng et al.

(10) Patent No.: US 12,033,612 B2
(45) Date of Patent: Jul. 9, 2024

(54) SPEECH SYNTHESIS METHOD AND APPARATUS, AND READABLE STORAGE MEDIUM

(71) Applicant: TENCENT TECHNOLOGY (SHENZHEN) COMPANY LIMITED, Shenzhen (CN)

(72) Inventors: Yibin Zheng, Shenzhen (CN); Xinhui Li, Shenzhen (CN); Li Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/984,437

(22) Filed: Nov. 10, 2022

(65) Prior Publication Data
US 2023/0075891 A1    Mar. 9, 2023

Related U.S. Application Data

(63) Continuation of application No. PCT/CN2022/079502, filed on Mar. 7, 2022.

(30) Foreign Application Priority Data

Mar. 11, 2021    (CN) .......................... 202110267221.5

(51) Int. Cl.
  *G10L 13/02*    (2013.01)
  *G10L 19/04*    (2013.01)
  *G10L 21/043*    (2013.01)

(52) U.S. Cl.
  CPC .............. *G10L 13/02* (2013.01); *G10L 19/04* (2013.01); *G10L 21/043* (2013.01)

(58) Field of Classification Search
  CPC ....... G10L 13/02; G10L 19/04; G10L 21/043; G10L 13/047; G06N 3/02
  See application file for complete search history.

(56) References Cited

U.S. PATENT DOCUMENTS

| 2018/0114522 A1* | 4/2018 | Hall ...................... G10L 13/047 |
| 2020/0372897 A1* | 11/2020 | Battenberg ............. G06N 3/088 |
| 2022/0005481 A1* | 1/2022 | Kim ........................ G10L 17/02 |

FOREIGN PATENT DOCUMENTS

CN    112687259 A    4/2021

OTHER PUBLICATIONS

Liu, Peng, et al. "Vara-tts: Non-autoregressive text-to-speech synthesis based on very deep vae with residual attention." arXiv preprint arXiv:2102.06431 (2021) (Year: 2021).*

(Continued)

*Primary Examiner* — Pierre Louis Desir
*Assistant Examiner* — Keisha Y. Castillo-Torres
(74) *Attorney, Agent, or Firm* — ANOVA LAW GROUP, PLLC

(57) ABSTRACT

A speech synthesis method includes: converting a text input sequence into a text feature representation sequence; inputting the text feature representation sequence into an encoder including N encoding layers; the N encoding layers including an encoding layer $E_i$ and an encoding layer $E_{i+1}$; the encoding layer $E_{i+1}$ including a first multi-head self-attention network; acquiring a first attention matrix and a historical text encoded sequence outputted by the encoding layer $E_i$, and generating a second attention matrix of the encoding layer $E_{i+1}$ according to residual connection between the first attention matrix and the first multi-head self-attention network and the historical text encoded sequence; and generating a target text encoded sequence of the encoding layer $E_{i+1}$ according to the second attention matrix and the historical text encoded sequence, and gen- (Continued)

erating synthesized speech data matched with the text input sequence based on the target text encoded sequence.

20 Claims, 13 Drawing Sheets

(56) References Cited

OTHER PUBLICATIONS

The World Intellectual Property Organization (WIPO) International Search Report for PCT/CN2022/079502 dated Apr. 24, 2022 7 Pages (including translation).
Peng Liu et al., 'VARA-TTS: Non-Autoregressive Text-to-Speech Synthesis based on Very Deep VAE with Residual Attention' Feb. 12, 2021. arXiv:2102.06431v1.
Yuxuan Wang et al., "TACOTRON: Towards End-To-End Speech Synthesis", 2017, arXiv preprint arXiv:1703.10135.
Jonathan Shen et al., "Natural TTS Synthesis by Conditioningwavenet on MEL Spectrogram Predictions", 2018, 2018 IEEE International Conference on Acoustics, Speech and Signal Processing (ICASSP).
Arik et al., "Deep Voice: Real-time Neural Text-to-Speech", 2017, p. 195-204, Proceedings of the 34th International Conference on Machine Learning—vol. 70.
Naihan Li et al., "Close to Human Quality TTS with Transformer", 2018, arXiv preprint arXiv:1809.08895.
Yi Ren et al., "FastSpeech: Fast, Robust and Controllable Text to Speech", 2019, p. 3171-3180, Advances in Neural Information Processing Systems.
Yi Ren et al., "FASTSPEECH 2: Fast and High-Quality End-Toend Text to Speech", 2020, arXiv preprint arXiv:2006.04558.

\* cited by examiner

SPEECH SYNTHESIS METHOD AND APPARATUS, AND READABLE STORAGE MEDIUM

CROSS-REFERENCES TO RELATED APPLICATIONS

This application is a continuation application of PCT Patent Application No. PCT/CN2022/079502, filed on Mar. 7, 2022, which claims priority to Chinese Patent Application No. 202110267221.5, entitled "SPEECH SYNTHESIS METHOD AND APPARATUS, AND READABLE STORAGE MEDIUM", filed with the Chinese Patent Office on Mar. 11, 2021, the entire contents of all of which are incorporated herein by reference in their entirety.

FIELD OF THE TECHNOLOGY

The present disclosure relates to the field of Internet technologies and, in particular, to speech synthesis.

BACKGROUND OF THE DISCLOSURE

As computing power increases massively, deep learning technology has been studied and applied on a large scale, which further promotes the development of speech synthesis technology. At present, based on neural network, the end-to-end Text-to-Speech (TTS) technology has been developed rapidly. Compared with the concatenative synthesis and statistical parametric synthesis in existing speech synthesis, speech data generated by the end-to-end TTS technology usually provide better sound naturalness. For example, an encoding and decoding framework based on an attention mechanism (e.g., a transformer-based speech synthesis acoustic model) may be used to predict acoustic feature sequence directly from inputted character sequence or phoneme sequence by the end-to-end TTS technology.

Problems arises, however, as convergence of the speech synthesis acoustic model and stability of the finally synthesized speech are often affected by current structure of the speech synthesis acoustic model.

SUMMARY

Embodiments of the present disclosure provide a speech synthesis method and apparatus, and a computer readable storage medium, thereby providing accelerated model convergence and improved stability of the synthesized speech.

In one aspect, an embodiment of the present disclosure provides a speech synthesis method. The method includes: converting a text input sequence into a text feature representation sequence; inputting the text feature representation sequence into an encoder including N encoding layers; the N encoding layers including an encoding layer $E_i$ and an encoding layer $E_{i+1}$, the encoding layer $E_{i+1}$ being a next encoding layer of the encoding layer $E_i$, N being an integer greater than 1, i being a positive integer, and i being less than N; and the encoding layer $E_{i+1}$ including a first multi-head self-attention network; acquiring a first attention matrix and a historical text encoded sequence outputted by the encoding layer $E_i$, and generating a second attention matrix of the encoding layer $E_{i+1}$ according to residual connection between the first attention matrix and the first multi-head self-attention network and the historical text encoded sequence; and generating a target text encoded sequence of the encoding layer $E_{i+1}$ according to the second attention matrix and the historical text encoded sequence, and generating synthesized speech data matched with the text input sequence based on the target text encoded sequence.

In one aspect, an embodiment of the present disclosure provides a speech synthesis method. The method includes: inputting a text sample sequence into an initial residual attention acoustic model, and converting the text sample sequence into a text feature sample sequence through the initial residual attention acoustic model; inputting the text feature sample sequence into an initial encoder including N initial encoding layers in the initial residual attention acoustic model; the N initial encoding layers including an initial encoding layer $X_i$ and an initial encoding layer $X_{i+1}$, the initial encoding layer $X_{i+1}$ being a next encoding layer of the initial encoding layer $X_i$, N being an integer greater than 1, i being a positive integer, and i being less than N; the initial encoding layer $X_{i+1}$ including an initial multi-head self-attention network; acquiring a first attention matrix and a historical text encoded sequence outputted by the initial encoding layer $X_i$, and generating a second attention matrix of the initial encoding layer $X_{i+1}$ according to residual connection between the first attention matrix and the initial multi-head self-attention network and the historical text encoded sequence; generating a target text encoded sequence of the initial encoding layer $X_{i+1}$ according to the second attention matrix and the historical text encoded sequence, and generating predicted speech data matched with the text sample sequence based on the target text encoded sequence; and generating a speech loss function according to the predicted speech data and reference speech data, and modifying model parameters in the initial residual attention acoustic model through the speech loss function to obtain a residual attention acoustic model; the residual attention acoustic model being used for generating synthesized speech data matched with the text input sequence.

In one aspect, an embodiment of the present disclosure provides a computer device. The computer device includes: a processor, a memory and a network interface; the processor being connected to the memory and the network interface, the network interface being configured to provide a data communication function, the memory being configured to store a computer program, and the processor being configured to invoke the computer program to perform a speech synthesis method. The method includes: converting a text input sequence into a text feature representation sequence; inputting the text feature representation sequence into an encoder including N encoding layers; the N encoding layers including an encoding layer $E_i$ and an encoding layer $E_{i+1}$, the encoding layer $E_{i+1}$ being a next encoding layer of the encoding layer $E_i$, N being an integer greater than 1, i being a positive integer, and i being less than N; and the encoding layer $E_{i+1}$ including a first multi-head self-attention network; acquiring a first attention matrix and a historical text encoded sequence outputted by the encoding layer $E_i$, and generating a second attention matrix of the encoding layer $E_{i+1}$ according to residual connection between the first attention matrix and the first multi-head self-attention network and the historical text encoded sequence; and generating a target text encoded sequence of the encoding layer $E_{i+1}$ according to the second attention matrix and the historical text encoded sequence, and generating synthesized speech data matched with the text input sequence based on the target text encoded sequence.

In one aspect, an embodiment of the present disclosure provides a non-transitory computer-readable storage medium storing a computer program, the computer program being adapted to be loaded and executed by a processor to perform a speech synthesis method. The method includes:

converting a text input sequence into a text feature representation sequence; inputting the text feature representation sequence into an encoder including N encoding layers; the N encoding layers including an encoding layer $E_i$ and an encoding layer $E_{i+1}$, the encoding layer $E_{i+1}$ being a next encoding layer of the encoding layer $E_i$, N being an integer greater than 1, i being a positive integer, and i being less than N; and the encoding layer $E_{i+1}$ including a first multi-head self-attention network; acquiring a first attention matrix and a historical text encoded sequence outputted by the encoding layer $E_i$, and generating a second attention matrix of the encoding layer $E_{i+1}$ according to residual connection between the first attention matrix and the first multi-head self-attention network and the historical text encoded sequence; and generating a target text encoded sequence of the encoding layer $E_{i+1}$ according to the second attention matrix and the historical text encoded sequence, and generating synthesized speech data matched with the text input sequence based on the target text encoded sequence.

According to the embodiments of the present disclosure, the text input sequence may be converted into the text feature representation sequence, and further, the text feature representation sequence may be inputted into the encoder including the N encoding layers. In the encoder, while calculating the attention matrix of the current encoding layer, the second attention matrix of the current encoding layer may be generated according to the residual connection between the first attention matrix outputted by the previous encoding layer and the multi-head self-attention network in the current encoding layer and the historical text encoded sequence outputted by the previous encoding layer, and further, the target text encoded sequence of the current encoding layer may be generated according to the obtained second attention matrix and the historical text encoded sequence. Finally, the synthesized speech data matched with the above text input sequence may be generated based on the target text encoded sequence. As can be seen, in the process of synthesizing speech data, the embodiments of the present disclosure can fully utilize the calculation results of each network, and the residual is put into the attention matrix, i.e., residual connection is performed on the attention matrix of each layer, so that the attention matrix of each layer can communicate with each other, which effectively accelerates the convergence of the model and makes the attention matrix of each network tend to be the same, thereby improving the clarity and stability of the synthesized speech.

DESCRIPTION OF EMBODIMENTS

Figure 1:
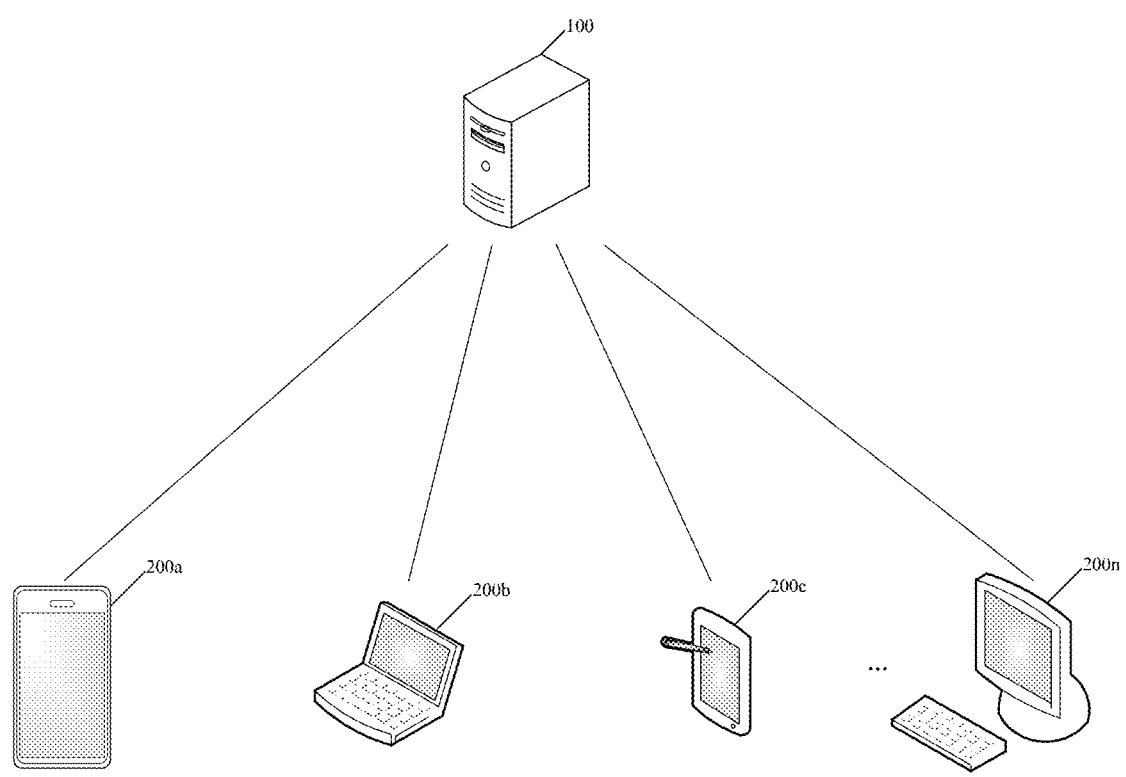
FIG. 1 is a schematic diagram of a system architecture provided by an embodiment of the present disclosure.

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. The AI is to study the design principles and implementation methods of various intelligent machines, to enable the machines to have the functions of perception, reasoning, and decision-making.

AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include a computer vision technology, a speech processing technology, a natural language processing technology, machine learning/deep learning, and the like.

Key technologies of the speech technology include an automatic speech recognition (ASR) technology, a text-to-speech technology and a voiceprint recognition technology. The text-to-Speech (TTS) technology, also known as speech synthesis technology, is a technology that converts text information generated by the computer itself or inputted from external sources into intelligible and highly natural speech output. This is equivalent to installing an artificial mouth on the machine, so that the machine can say what it wants to express through different timbres. Text-to-Speech involves multiple disciplines and techniques such as acoustics, linguistics, digital signal processing and computer science.

A Text-to-Speech system is mainly composed of two parts: a language analysis part and an acoustic system part, also known as a front-end and a back-end. The language analysis part mainly analyzes inputted text information to generate corresponding linguistic specifications, thereby figuring out on how to read. The acoustic system part mainly generates a corresponding audio according to the linguistic specifications provided by the language analysis part, thereby producing sound. There are currently three technologies to implement the acoustic system part: waveform concatenation, statistical parametric synthesis and end-to-end Text-to-Speech. End-to-end Text-to-Speech is currently a relatively hot technology. Based on neural network learning, it is possible to directly input text or phonetic characters, with a black box in the middle, and output a synthesized audio, which greatly simplifies the original complex language analysis part. Examples include wavenet (a technique that models the original audio waveform using neural networks), Tacotron (an end-to-end Text-to-Speech model that synthesizes speech directly from text), Tacotron2 (an improved model of Tacotron) and deepvoice3 (a fully-convolutional attention-based neural text-to-speech system). End-to-end Text-to-Speech has much lower requirements for linguistic knowledge, and can realize speech synthesis in multiple languages, which makes speech synthesis no longer restricted by linguistic knowledge. The end-to-end synthesized audio has better effects, and sounds indistinguishable from real human voices. However, in the related art, the acoustic model is an autoregressive generative model that generates acoustic parameters slowly. In addition, inaccurate attention alignment may also lead to unstable synthesized speech, resulting in missing words and repeated words. Some speech synthesis acoustic models have been optimized for the above problems using Transformer-based feedforward networks, but they are just a simple stack of multiple feedforward networks. As the number of networks stacked increases, the vanishing gradient problem will occur, which affects the convergence of the model and the stability of the final synthesized speech.

The solutions provided in the embodiments of the present disclosure involve technologies such as a text-to-speech technology and deep learning of AI, and are exemplarily described in the following embodiments.

Referring to FIG. 1, which is a schematic diagram of a system architecture provided by an embodiment of the present disclosure. The system architecture may include a service server 100 and a cluster of terminals. The cluster of terminals may include: a terminal device 200a, a terminal device 200b, a terminal device 200c, . . . , and a terminal device 200n. There may be communication connections between the cluster of terminals. For example, there is a communication connection between the terminal device 200a and the terminal device 200b, and there is a communication connection between the terminal device 200a and the terminal device 200c. There may be a communication connection between any terminal device in the cluster of terminals and the service server 100. For example, there is a communication connection between the terminal device 200a and the service server 100. There is no limitation to the manner of the communication connection. The communication connection may be a direct or indirect connection through wired communication or a direct or indirect connection through wireless communication, and may also be other manners, which is not limited in the present disclosure.

Each terminal device in the cluster of terminals shown in FIG. 1 may be installed with an application client. When running in each terminal device, the application client may respectively perform data interchange with the service server 100 shown in FIG. 1, so that the service server 100 may receive service data from each terminal device. The application client may be a game application, a social application, an instant messaging application, an in-vehicle application, a webcasting application, a short video application, a video application, a music application, a shopping application, an education application, a novel application, a news application, a payment application, a browser or other application client that can display data information such as text, images, audios and videos. The application client may be an independent client, or an embedded sub-client integrated in a client (for example, a game client, a shopping client, a news client, etc.), which is not limited here. The service server 100 may be a collection of a plurality of servers such as a back-end server, a data processing server and a stream caching server corresponding to the application client.

The service server 100 may provide a text-to-speech service for the cluster of terminals through the communication function. For example, the terminal device (which may be the terminal device 200a, the terminal device 200b, the terminal device 200c or the terminal device 200n) may acquire text data displayed in a certain application client A (e.g., the news application) listed above and perform text processing on the text data to obtain a text input sequence. Further, the service server 100 may call a trained deep-learning-based residual attention acoustic model. In the residual attention acoustic model, the text input sequence is converted into a text feature representation sequence. Further, the text feature representation sequence may be sequentially subjected to encoding, length regulation, decoding, linear transform, etc. to obtain a corresponding acoustic feature sequence. Finally, synthesized speech data matched with the text input sequence may be obtained based on the acoustic feature sequence. Then, the obtained synthesized speech data may be returned to the application client A, and the terminal device may play back the synthesized speech data in the application client A. For example, when the application client A is a client corresponding to the news application, all text in a certain piece of news may be converted into synthesized speech data, so that the user may acquire relevant information in the news by playing back the synthesized speech data.

In an in-vehicle scenario, an in-vehicle terminal is configured on the vehicle. For the sake of safety and convenience, the in-vehicle terminal may be installed with an independent in-vehicle application with a text-to-speech function. For example, when the user receives a short message or session message while driving the vehicle, he may trigger a speech conversion control in the in-vehicle application, such that the content of the short message or session message is converted into speech which is then played back. Alternatively, the in-vehicle application with the text-to-speech function may be embedded into other in-vehicle applications, such that in particular cases, text information the user wants to acquire is converted into speech which is then played back. Alternatively, the application client with the text-to-speech function may be installed on a mobile terminal with a mobile Internet function, such as a smartphone, a tablet computer, etc., and the mobile terminal and the in-vehicle terminal may establish a data connection through the local wireless local area network or Bluetooth. After completing the text-to-speech conversion, the mobile terminal may transmit the synthesized speech data to the in-vehicle terminal, and the in-vehicle terminal may play back the speech data through an in-vehicle speaker after receiving the speech data.

In some embodiments, the system architecture may include a plurality of service servers, one terminal device may be connected to one service server, and each service server may acquire service data in the terminal device connected thereto (for example, all text data in a web page or a part of text data selected by the user), so that the residual attention acoustic model can be called to convert the service data into synthesized speech data.

In some embodiments, the terminal device may also acquire the service data, so that the residual attention acoustic model can be called to convert the service data into synthesized speech data.

The residual attention acoustic model is a parallel speech synthesis acoustic model based on residual attention, that is, in the process of encoding or decoding, the model performs residual connection on the attention matrix calculated by each network. Therefore, in the process of synthesizing speech data, the calculation results of each network can be fully utilized, so that the attention matrix of each layer can communicate with each other, which effectively accelerates the convergence of the model and makes the attention matrix of each network tend to be the same, thereby improving the clarity and stability of the synthesized speech.

The method disclosed according to the embodiments of the present disclosure may be executed by a computer device, and the computer device includes, but not limited to, a terminal device or a service server. The service server may be an independent physical server, or may be a server cluster including a plurality of physical servers or a distributed system, or may be a cloud server providing basic cloud computing services, such as a cloud database, a cloud service, cloud computing, a cloud function, cloud storage, a network service, cloud communication, a middleware service, a domain name service, a security service, a content delivery network (CDN), big data, and an artificial intelligence platform. The terminal device may be an intelligent terminal capable of running the foregoing application client such as a smartphone, a tablet computer, a notebook computer, a desktop computer, a palmtop computer, a mobile Internet device (MID), a wearable device (such as a smartwatch, a smart band and the like), and a smart computer and a smart in-vehicle device. The terminal device and the service server may be directly or indirectly connected in a wired or wireless manner. This is not limited in this embodiment of the present disclosure.

The service server may also be a node on a blockchain network. Blockchain is a new application mode of computer technology such as distributed data storage, point-to-point transmission, consensus mechanism and encryption algorithm. It is mainly used for organizing data in a chronological order and encrypting the data into a ledger, so that the data cannot be tampered with or forged while the data can be verified, stored and updated. The blockchain is essentially a decentralized database. Each node in the database stores an identical blockchain. The blockchain network includes consensus nodes which are responsible for the consensus of the whole blockchain network. As disclosed, a block is a data packet that carries transaction data (i.e., transaction service) on the blockchain network, and also a data structure that contains a timestamp and a hash of the previous block. The block verifies and determines transactions in the block through a consensus mechanism of the network.

A blockchain node system may include a plurality of nodes. The blockchain node system may correspond to a blockchain network (including but not limited to a blockchain network corresponding to a consortium blockchain). The plurality of nodes may specifically include the above-mentioned service servers, and the nodes here may be collectively referred to as blockchain nodes. Data sharing may be performed between the blockchain nodes. Each node may receive inputted information during normal operating, and maintain shared data in the blockchain node system based on the received inputted information. To ensure the interchange of information in the blockchain node system, there may be information connections among nodes in the blockchain node system, and the nodes may transmit information through the information connections. For example, when any node (such as the foregoing service server) in the blockchain node system receives inputted information (such as text data), other nodes in the blockchain node system obtain the inputted information according to a consensus algorithm, and store the inputted information as shared data, so that data stored in all nodes in the blockchain node system is consistent.

The method provided by the present disclosure can be naturally applied to any scenario where text needs to be converted into speech. For ease of understanding, the following will be described in detail by taking the terminal device 200a converting a piece of text into speech through the service server 100 as an example.

Figure 2A:
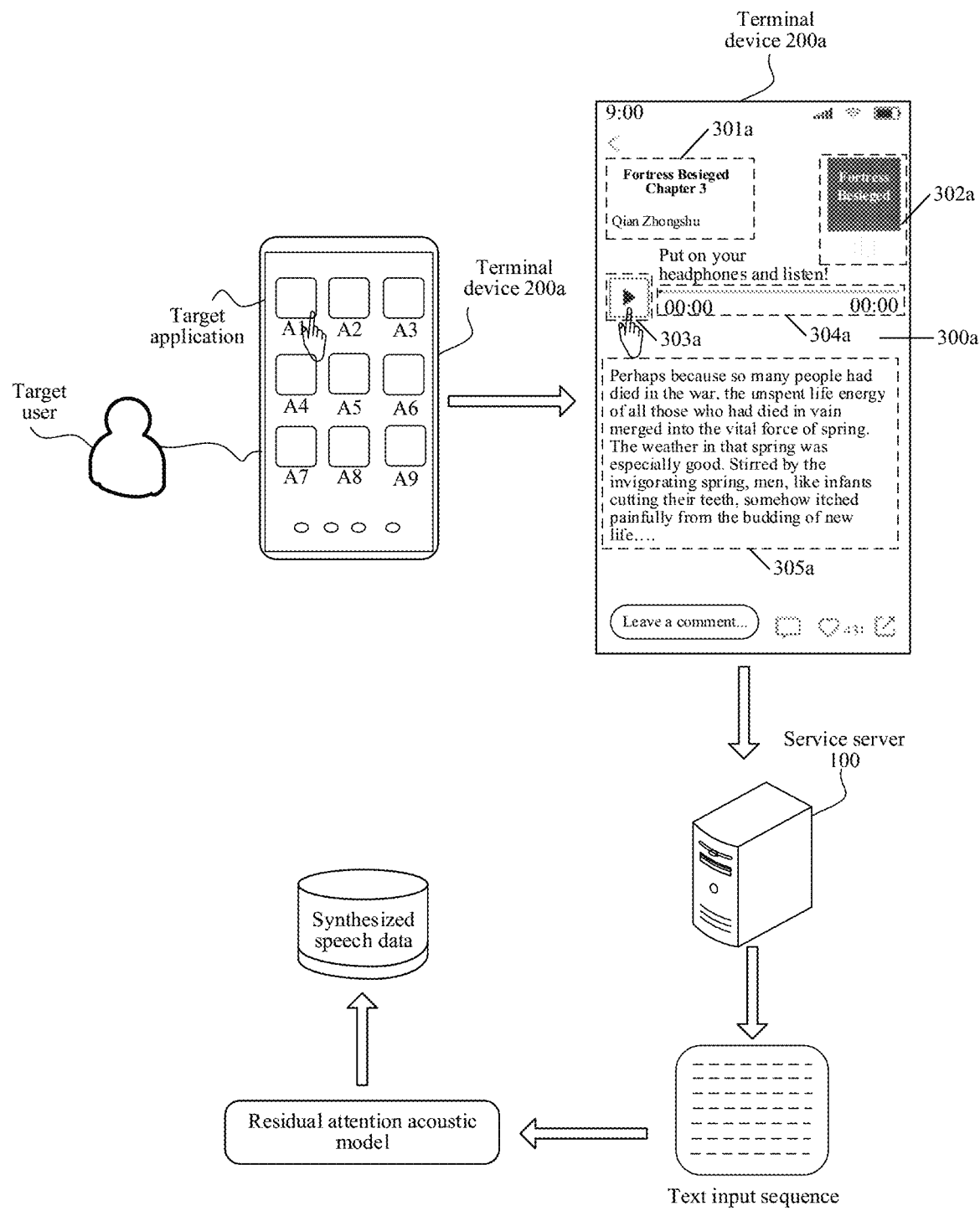
FIG. 2a-FIG. 2c are schematic scenario diagrams of speech synthesis provided by an embodiment of the present disclosure.
Figure 2B:
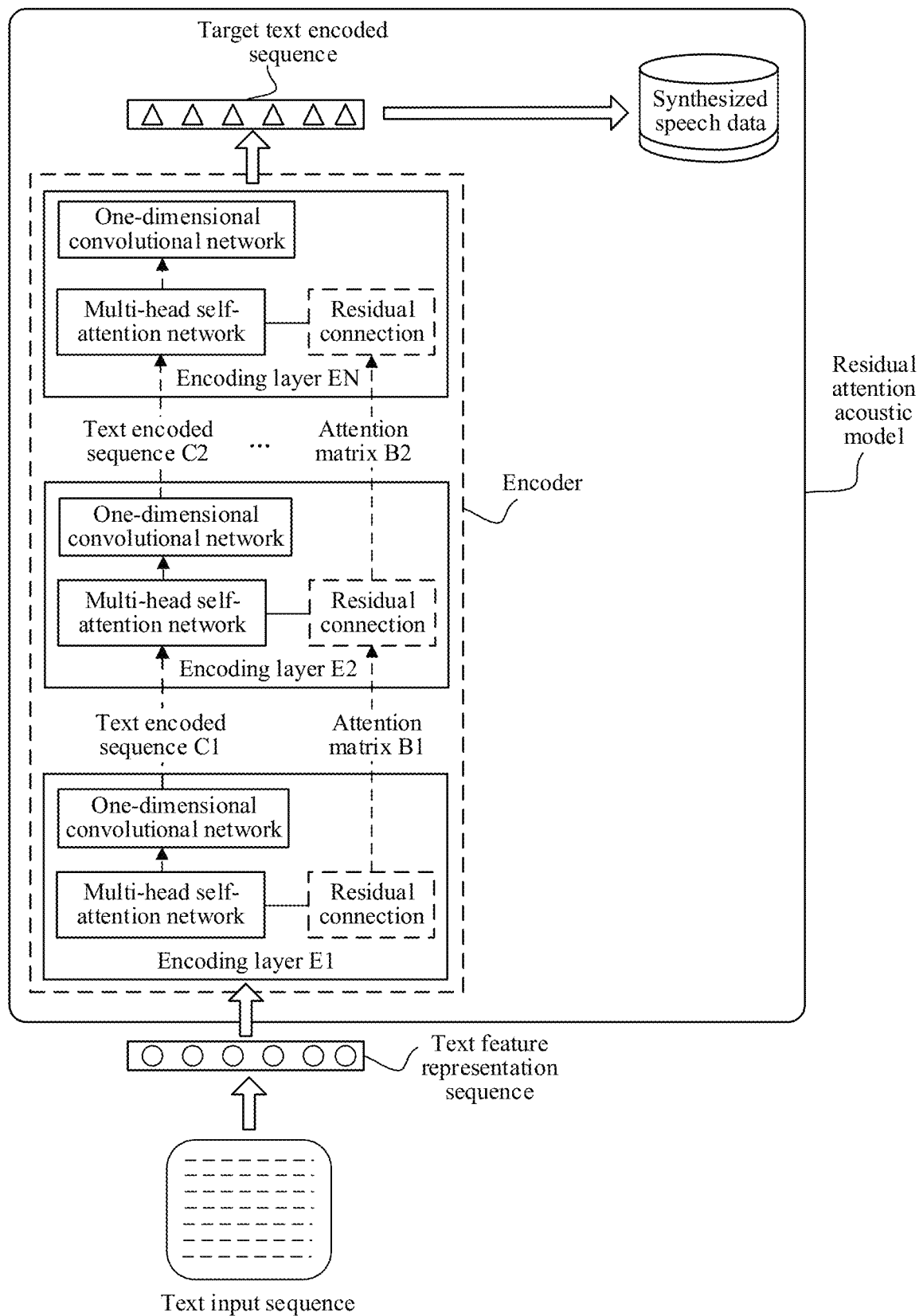
Figure 2C:
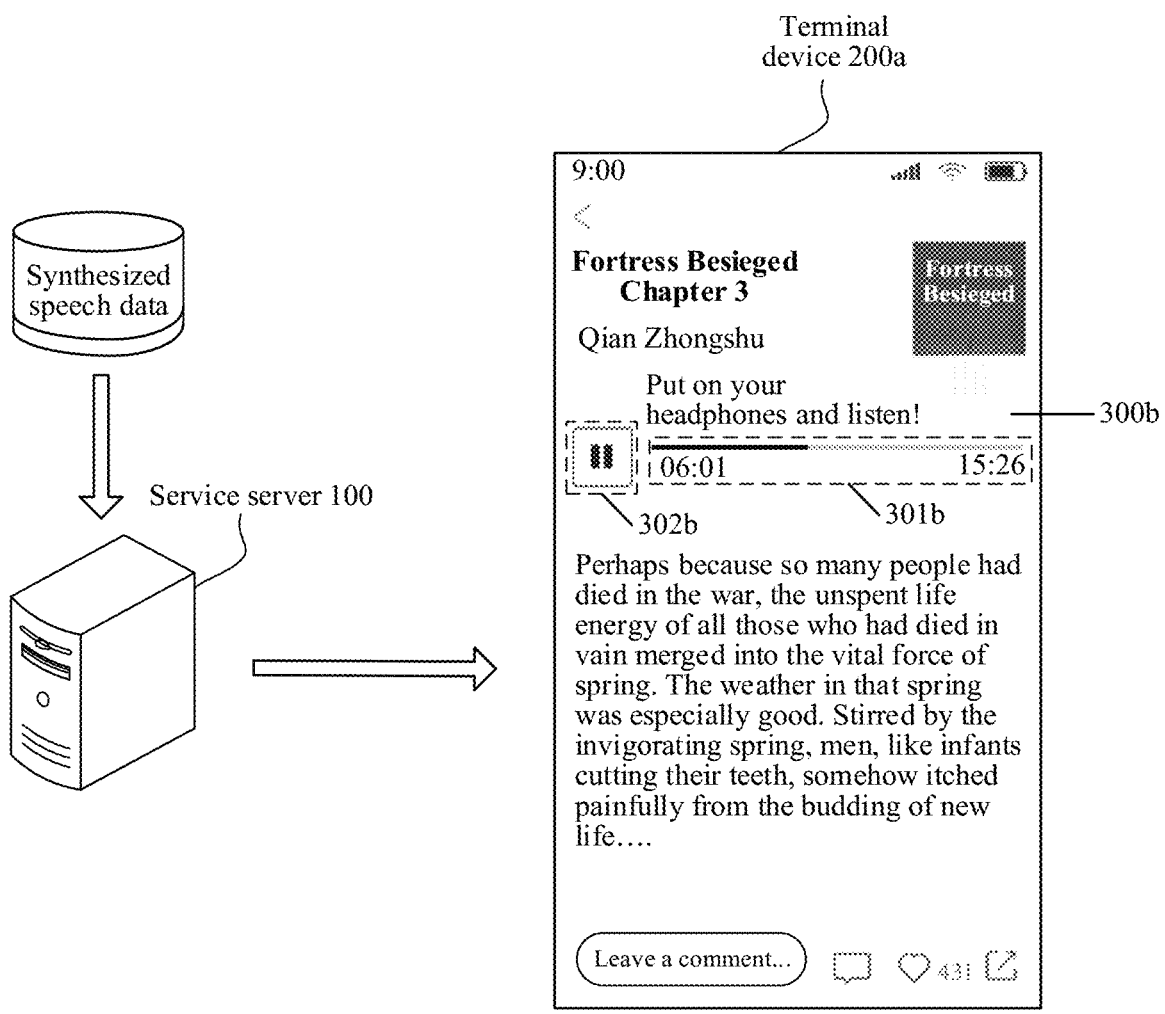

Referring to FIG. 2a-FIG. 2c, which are schematic scenario diagrams of speech synthesis provided by an embodiment of the present disclosure. The implementation process of this speech synthesis scenario may be performed in the service server 100 as shown in FIG. 1, or performed in the terminal device (any one of the terminal device 200a, the terminal device 200b, the terminal device 200c or the terminal device 200n as shown in FIG. 1), or executed by both the terminal device and the service server, which is not limited here. The embodiment of the present disclosure will be described by taking the execution by both the terminal device 200a and the service server 100 as an example. As shown in FIG. 2a, a target user holds the terminal device 200a, and the terminal device 200a may be installed with a plurality of applications (such as education applications, shopping applications, reading applications, etc.). Assuming that the target user wants to open one of the applications, such as the target application AI, the terminal device 200a may display a display interface corresponding to the target application AI on the screen in response to a trigger operation (such as a tap operation) for the target application AI. Assuming that the target application AI is a reading application, the terminal device 200a may transmit a data access request to the service server 100, and the service server 100 may recommend specific e-books for the target user according to the data access request. For example, a default homepage corresponding to the target application AI may display a list of recommended e-books according to the reading preferences of the target user, or display a list of recommended e-books that are similar to history e-books browsed by the target user, or display a list of recommended e-books that are popular right now. As shown in FIG. 2a, assuming that the target user opens Chapter 3 of "Fortress Besieged" by selecting one of the options in the list of recommended e-books, then in the display interface 300a corresponding to the target application AI, the title and author corresponding to the e-book currently opened by the target user may be displayed in a display area 301a, picture data such as related cover images or illustrations may be displayed in a display area 302a, and the content corresponding to the current chapter may be displayed in a display area 305a.

Referring to FIG. 2a, when the target user wants to hear the speech converted from the content in the current chapter, he may tap a conversion control in the display area 303, so that the terminal device 200a can transmit a speech synthesis request to the service server 100 in response to the tap operation for the conversion control. At this time, the current playback progress corresponding to the speech playback progress bar and the total duration of the synthesized speech displayed in the display area 304a are both "00:00", indicating that no speech data has been synthesized yet at the moment. After receiving the speech synthesis request, the service server 100 may acquire all the content included in the current chapter and extract text data therefrom, and may further perform text processing on the extracted text data, including filtering out useless characters, format standardization, so as to obtain a text input sequence (a character sequence here) that is convenient for subsequent processing by the acoustic model. Further, the service server 100 may input the text input sequence into a pre-trained residual attention acoustic model, so as to obtain corresponding synthesized speech data through the acoustic model. For the specific process of speech synthesis through the residual attention acoustic model, reference can be made to FIG. 2b. As shown in FIG. 2b, in the residual attention acoustic model, first, the text input sequence is converted to obtain a text feature representation sequence, and further, the text feature representation sequence may be inputted into an encoder. As shown in FIG. 2b, the encoder may include N encoding layers, namely an encoding layer E1, an encoding layer E2, . . . , and an encoding layer EN, and each encoding layer has the same network structure. The size of N may be adjusted according to the corpus size, which is not limited here. As shown in FIG. 2b, each encoding layer includes a multi-head self-attention network and a one-dimensional convolutional network (the multi-head self-attention network in each encoding layer may be referred to as a first multi-head self-attention network), and residual connection is performed between the multi-head self-attention network and the one-dimensional convolutional network of each encoding layer. An attention matrix of each encoding layer may be calculated based on the multi-head self-attention network, a text encoded sequence of each encoding layer may be calculated based on the attention matrix, and therefore, the text encoded sequence outputted by the last encoding layer (i.e., the encoding layer EN) may be determined as a target text encoded sequence. In the above residual attention acoustic model, residual connection is performed on the attention matrix of each layer, that is, information of the attention matrix of the previous encoding layer is needed when calculating the attention matrix of the current encoding layer.

For example, assuming that the encoder has 4 encoding layers, namely an encoding layer E1, an encoding layer E2, an encoding layer E3 and an encoding layer E4, then the text feature representation sequence is firstly inputted into the encoding layer E1, and the encoding layer E1 may generate an attention matrix B1 and a text encoded sequence C1 according to the text feature representation sequence, so that the text encoded sequence C1 and the attention matrix B1 may be transmitted into the encoding layer E2. In the encoding layer E2, an attention matrix B2 may be generated according to the residual connection between the attention matrix B1 and the multi-head self-attention network in the encoding layer E2 and the text encoded sequence C1, so that a text encoded sequence C2 may be generated according to the attention matrix B2 and the text encoded sequence C1. The encoding process in the encoding layer E2 and the encoding layer E3 is similar to that in the encoding layer E2, and will not be repeated here. By analogy, a text encoded sequence C4 generated by the encoding layer E4 may be finally determined as an encoding result outputted by the encoder, i.e., the target text encoded sequence.

Referring to FIG. 2b, further, in the residual attention acoustic model, synthesized speech data matched with the text input sequence may be generated based on the target text encoded sequence, with reference to FIG. 2a, that is, synthesized speech data corresponding to Chapter 3 of the current e-book "Fortress Besieged" may be generated based on the target text encoded sequence. This process also involves a duration predictor, a length regulator, a decoder, a linear layer, etc. in the residual attention acoustic model. For the specific process, reference can be made to the embodiment below corresponding to FIG. 5.

The service server 100 may train a deep neural network using a text database with massive text and an audio database to obtain the residual attention acoustic model. For the specific process, reference can be made to the embodiment below corresponding to FIG. 7. The residual attention acoustic model in FIG. 2b only shows part of the network structure for simple illustration. For a more detailed model framework, reference can be made to the related description in the embodiment below corresponding to FIG. 4a-FIG. 4b, which will not be repeated here.

Referring to FIG. 2c, as shown in FIG. 2c, the service server 100 may return the finally generated synthesized speech data to the terminal device 200a. After receiving the synthesized speech data, the terminal device 200a may play back the synthesized speech data in the display interface 300b of the target application AI. As can be seen, the pattern of the conversion control in the display area 302b has also changed at this time, that is, the "stop state" in the display area 303a in the display interface 300a in FIG. 2a has been updated to the "play state" in the display area 302b in the current display interface 300b. The terminal device 200a may pause the synthesized speech data being played in response to the target user's trigger operation for the conversion control, and subsequently, may resume playing the synthesized speech data in the paused state by triggering the conversion control again. Besides, in the display area 301b, the speech playback progress bar may be displayed, including the current playback progress (for example, "06:01", that is, the speech is currently played back to the $6^{th}$ minute and $1^{st}$ second) and the total duration of the synthesized speech (for example, "15:26", that is, the total duration is 15 minutes and 26 seconds). The target user may also adjust the current playback progress by dragging and dropping the speech playback progress bar.

In addition to the character sequence described in the above scenario, the representation form of the text input sequence may also be in the form of a phone sequence. A phone is the smallest unit of speech divided according to the natural attributes of speech. The residual attention acoustic model processes the phone sequence in the same way as the character sequence, which therefore will not be repeated here. Besides, the method provided by the present disclosure is applicable to any scenario where text needs to be converted into speech. Therefore, in addition to the reading application described above, the target application A1 may also be other types of applications. For example, when the target application A1 is a news application, the content of the news may be converted into speech data. When the target application A1 is a game application, speech that needs to be played back in the game, such as plot introductions and character monologues, may be synthesized by entering the corresponding text data. When the target application A1 is an application containing intelligent customer services (such as a shopping application), related text data may be entered and converted into speech data in advance, and when the customer's response triggers a certain rule, the intelligent customer service will play back the corresponding speech data.

The server 100 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data an artificial intelligence platform. Therefore, all the calculation processes mentioned above may be published on a plurality of physical servers or a plurality of cloud servers, that is, all text-to-speech calculations are completed in parallel in a distributed or cluster manner, so that synthesized speech data matched with the text input sequence can be quickly obtained.

As can be seen from above, the embodiments of the present disclosure provide a residual-attention-based speech synthesis acoustic model based on deep neural networks. In the process of synthesizing speech data, the embodiments of the present disclosure can fully utilize the calculation results of each network in the acoustic model, and the residual is put into the attention matrix, i.e., residual connection is performed on the attention matrix of each layer, so that the attention matrix of each layer can communicate with each other, which effectively accelerates the convergence of the model and makes the attention matrix of each network tend to be the same, thereby improving the clarity and stability of the synthesized speech. The embodiments of the present disclosure realize the function of rapidly converting text data into high-quality speech data.

Figure 3:
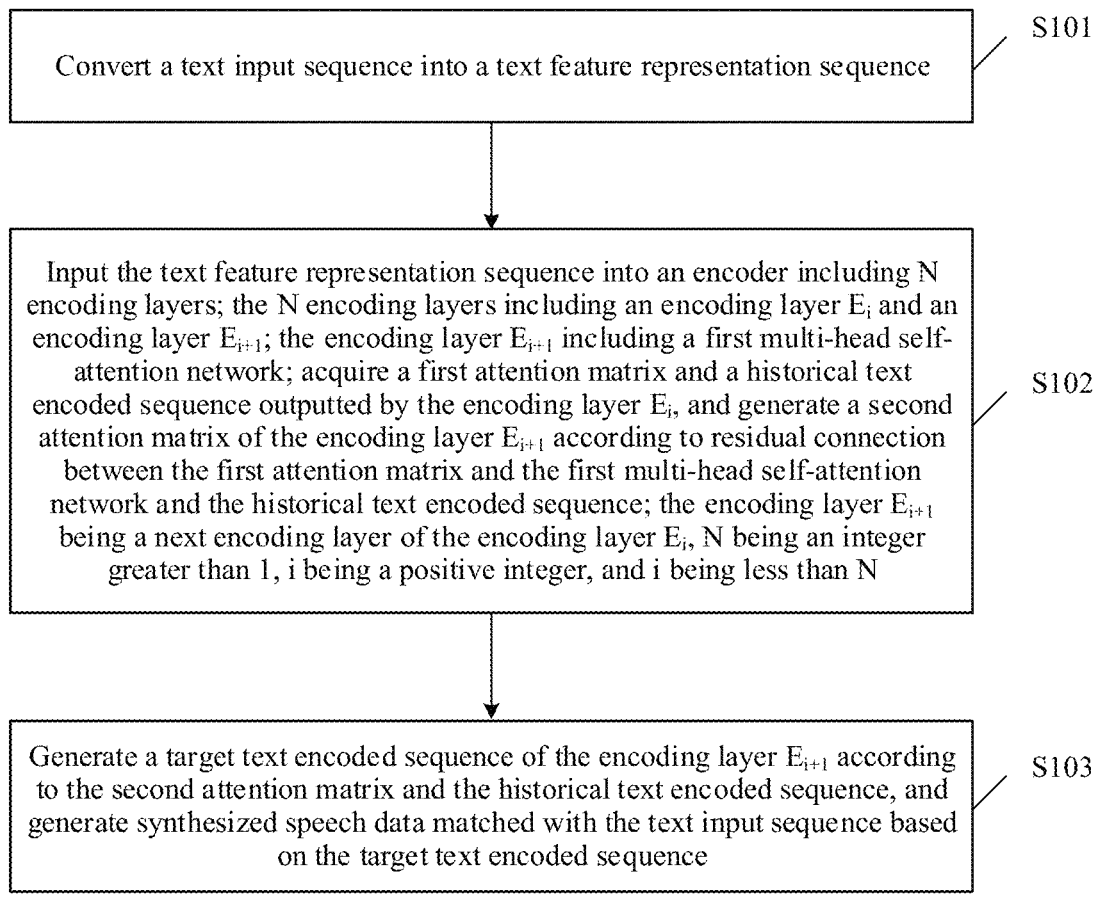
FIG. 3 is a schematic flowchart of a speech synthesis method provided by an embodiment of the present disclosure.

Referring to FIG. 3, FIG. 3 is a schematic flowchart of a speech synthesis method provided by an embodiment of the present disclosure. The speech synthesis method may be executed by a computer device. The computer device may include a terminal device or a service server as shown in FIG. 1. The speech synthesis method may include at least S101-S103 as follows:

S101: Convert a text input sequence into a text feature representation sequence.

For example, the method provided by the present disclosure may build a model based on characters or phonemes. Therefore, the computer device may first perform text preprocessing on the inputted characters or phonemes to obtain a text input sequence, and further input the text input sequence into a token embedding of the trained residual attention acoustic model for conversion to obtain the text feature representation sequence that is convenient for processing by the model. The specific process includes: in the residual attention acoustic model, inputting the text input sequence into the token embedding, looking up in a vector conversion table through the token embedding, and thereby using a feature vector matched with the text input sequence as the text feature representation sequence. In some embodiments, the look-up process may be implemented by one-hot table lookup (also referred to as one-hot encoding, which mainly uses the M-bit state register to encode M states, each state having its own independent register bit, and only one bit being valid at any one time). The vector conversion table may include a mapping relationship between characters and feature vectors, or between phonemes and feature vectors, and therefore, the vector conversion table may be constructed in advance before using the model.

In one embodiment, the maximum sequence length of the inputted characters or phonemes may be limited to 256, and the dimensionality of the vector corresponding to the text feature representation sequence is set to 256.

Figure 4A:
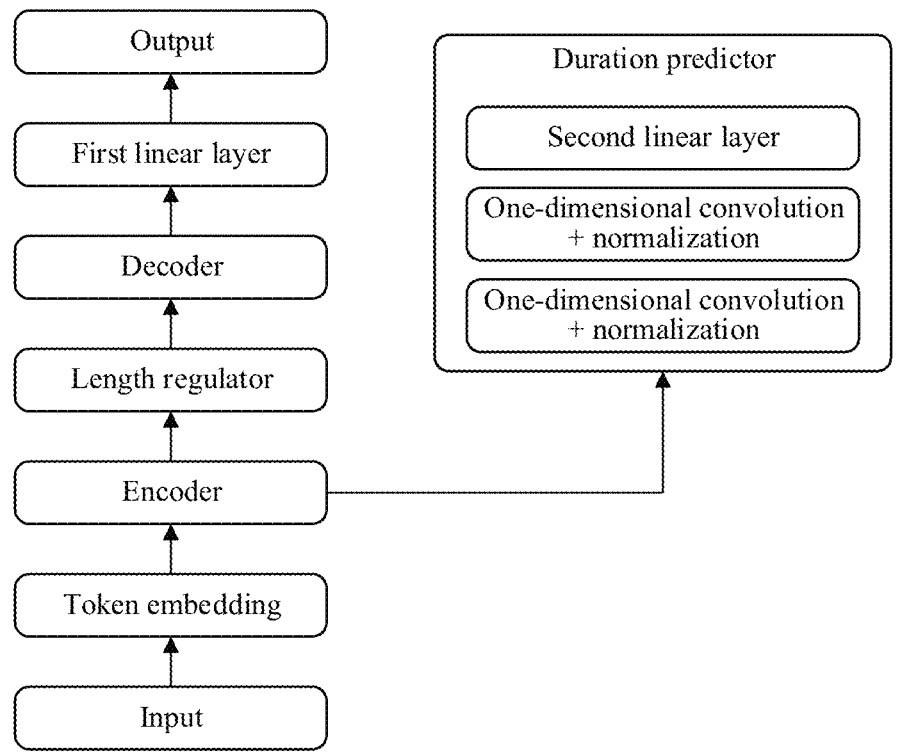
FIG. 4a-FIG. 4b are schematic diagrams of a network structure of a residual attention acoustic model provided by an embodiment of the present disclosure.
Figure 4B:
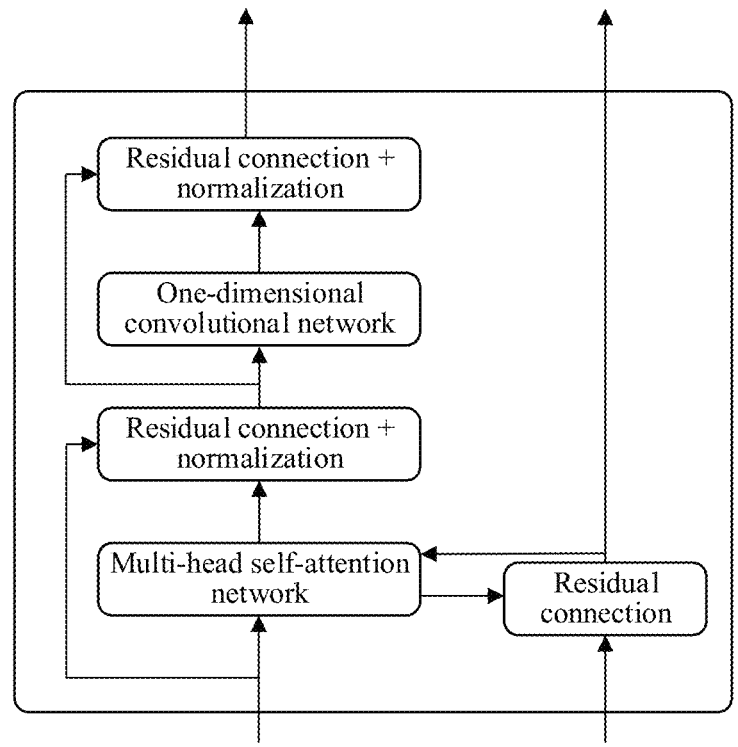

Referring to FIG. 4a-FIG. 4b, which are schematic diagrams of a network structure of a residual attention acoustic model provided by an embodiment of the present disclosure. As shown in FIG. 4a, in the network structure, the first part is the input of the residual attention acoustic model, and the input may detect the length, format, etc. corresponding to the inputted characters or phonemes. The second part of the network structure is the token embedding, which may also be referred to as the character/phone vector layer. The token embedding may convert each of the inputted characters or phonemes into a corresponding fixed-dimensional vector. After each of the inputted characters or phonemes is converted into a vector, the text feature representation sequence can be obtained.

S102: Input the text feature representation sequence into an encoder including N encoding layers; the N encoding layers including an encoding layer $E_i$ and an encoding layer $E_{i+1}$; the encoding layer $E_{i+1}$ including a first multi-head self-attention network; acquire a first attention matrix and a historical text encoded sequence outputted by the encoding layer $E_i$, and generate a second attention matrix of the encoding layer $E_{i+1}$ according to residual connection between the first attention matrix and the first multi-head self-attention network and the historical text encoded sequence; the encoding layer $E_{i+1}$ being a next encoding layer of the encoding layer $E_i$, N being an integer greater than 1, i being a positive integer, and i being less than N.

The first attention matrix is used for identifying attention parameters used in the process that the encoding layer $E_i$ encodes the inputted data to obtain the target text encoded sequence. The computer device may obtain the second attention matrix by performing residual connection on the first attention matrix and the first multi-head self-attention network included in the encoding layer $E_{i+1}$. The second attention matrix serves as the attention parameters used in the process that the encoding layer $E_{i+1}$ encodes the historical text encoded sequence to obtain the target text encoded sequence.

That is, when generating the second attention matrix, the encoding layer $E_i$ and the encoding layer $E_{i+1}$ communicate with each other in terms of attention parameters. Thereby, in the process of encoding by the encoder to obtain the target text encoded sequence, the attention matrix used by each encoding layer of the encoder tends to be the same, which is beneficial to improving the clarity and stability of the subsequently generated speech data.

For example, in the residual attention acoustic model, the computer device may input the converted text feature representation sequence into the encoder in the network structure as shown in FIG. 4a. The encoder includes N encoding layers. N is an integer greater than 1. In various embodiments, N may be adjusted according to the corpus size. Each encoding layer has the same structure. For the specific schematic structural diagram, reference can be made to FIG. 4b. As shown in FIG. 4b, the encoder in the residual attention acoustic model according to the embodiment of the present disclosure is a multi-head self-attention-based feed-forward network structure that combines residual multi-head self-attention layers and one-dimensional convolution. The residual multi-head self-attention layer uses the multi-head self-attention network to extract cross position information, and encodes the inputted information through the cross position information. That is, each encoding layer includes a multi-head self-attention network and a one-dimensional convolutional network (the multi-head self-attention network in each encoding layer may be referred to as the first multi-head self-attention network), and the two networks use one residual connection. Each multi-head self-attention network includes at least two single-head self-attention networks (each single-head self-attention network in the first multi-head self-attention network may be referred to as the first single-head self-attention network), and the specific number of the single-head self-attention networks may be adjusted according to actual needs and is not limited in the embodiment of the present disclosure.

It is assumed that the N encoding layers include an encoding layer $E_i$ and an encoding layer $E_{i+1}$, and the encoding layer $E_{i+1}$ is a next encoding layer of the encoding layer $E_i$, i being a positive integer, and i being less than N. In order to obtain the encoding result of the encoding layer $E_{i+1}$, first, it is required to generate an attention matrix of the encoding layer $E_{i+1}$ based on the output result of the previous encoding layer, which is referred to as the second attention matrix. That is, it is required to acquire the first attention matrix and the historical text encoded sequence outputted by the encoding layer $E_i$, so that the encoding layer $E_{i+1}$ can generate the second attention matrix of the encoding layer $E_{i+1}$ according to the residual connection between the first attention matrix and the first multi-head self-attention network in the encoding layer $E_{i+1}$ and the historical text encoded sequence. The specific process may include: First, the first attention matrix and the historical text encoded sequence outputted by the encoding layer $E_i$ are acquired. The historical text encoded sequence may include first matching matrices respectively corresponding to the at least two first single-head self-attention networks. That is, the first matching matrices may be initialized according to the historical text encoded sequence. The first matching matrix includes a Query matrix, a Key matrix and a Value matrix corresponding to the first multi-head self-attention network. These three matrices may be used for reducing the attention to irrelevant characters or phonemes while keeping the attention to the current character or phone unchanged. For each first single-head self-attention network, the corresponding Query matrix, Key matrix and Value matrix are respectively equal to the historical text encoded sequence outputted by the encoding layer $E_i$. Further, a first mapping matrix corresponding to the first multi-head self-attention network may be acquired. The first mapping matrix is used for mapping the first matching matrix into different forms. The first mapping matrix also includes three different matrices, namely a mapping matrix $W^Q$ corresponding to the Query matrix, a mapping matrix $W^K$ corresponding to the Key matrix and a mapping matrix $W^V$ corresponding to the Value matrix. The mapping matrix $W^Q$, the mapping matrix $W^K$ and mapping matrix $W^V$ may all obtained by random initialization and relevant network optimization. Therefore, for each first single-head self-attention network, these three mapping matrices are different.

Before calculating the second attention matrix, it is required to calculate a sub-attention matrix respectively corresponding to each first single-head self-attention network in the encoding layer $E_{i+1}$ according to the residual connection among the first mapping matrix, the first matching matrix and the first attention matrix. The specific calculation formula is as follows:

$$\text{head}_i = ResidualAttention(QW_i^Q, KW_i^K, VW_i^V, Prev_i).$$

$$ResidualAttention(Q', K', V', Prev') = \text{Softmax}\left(\frac{Q'K'^T}{\sqrt{d_k}} + Prev'\right)V'.$$

$Q'=QW_i^Q$, $K'=KW_i^K$, $V'=VW_i^V$ and $Prev'=Prev_i$ are put into the above formula so as to obtain the sub-attention matrix $\text{head}_i$ corresponding to the $i^{th}$ first single-head self-attention network (i is a positive integer). In the above calculation formula, Q, K and V respectively represent the Query matrix, the Key matrix and the Value matrix, $W_i^Q$, $W_i^K$ and $W_i^V$ represent the mapping matrices corresponding to the $i^{th}$ first single-head self-attention network, and $Prev_i$ represents a split matrix extracted from the first attention matrix corresponding to the it first single-head self-attention network. For example, the first attention matrix may be equally divided according to the total number of the first single-head self-attention networks. For example, assuming that there are 4 first single-head self-attention networks and the dimensionality of the first attention matrix is 4*16, then the first attention matrix may be equally divided into four 4*4 split matrices. Each first single-head self-attention network uses one of the split matrices for calculation. Prev' in the formula means that residual connection is performed on the attention matrices of the adjacent two encoding layers. Referring to FIG. 4b, in the network structure of the encoder, the multi-head self-attention network of the current encoding layer performs residual connection with the attention matrix outputted by the previous encoding layer, so that the attention matrix of each encoding layer can naturally communicate with each other. Being divided by $\sqrt{d_k}$ (dk is the dimensionality of the matrix K) may play a regulating role to prevent vanishing gradients, $\sqrt{d_k}$ is not a unique value, and it is mainly obtained from experience. Softmax function, also known as normalized exponential function, can normalize the calculation results into probabilities. Then, weighted summation is performed on the matrix V to obtain the sub-attention matrix $\text{head}_i$ corresponding to the $i^{th}$ first single-head self-attention network. Further, the sub-attention matrices corresponding to all the first single-head self-attention networks are concatenated, and a linear transformation is performed to obtain the second attention matrix of the encoding layer $E_{i+1}$. The second attention matrix will be passed to the next encoding layer through the same process as above.

As can be seen from the above, compared with the single-head self-attention network, assuming that the multi-head self-attention network includes h single-head self-attention networks, then the multi-head self-attention network has the advantage of performing h calculations instead of just one calculation, which allows the residual attention acoustic model to learn relevant information in different subrepresentations. The existing Transformer-based speech synthesis acoustic model is just a simple stack of modules containing multi-head self-attention, and does not fully utilize the calculation results of the previous network. As the number of stacked layers increases, the gradient vanishes, which will affect the convergence of the model and the stability of the final synthesized speech. In order to fully utilize the calculation results of each network, the embodiments of the present disclosure reduces the instability of the model caused by gradient calculation by performing residual connection on the attention matrix of each network, thereby effectively accelerating the convergence of the model. Besides, with the multi-head self-attention, strong parallel computing power can be achieved, and it is also convenient to use other more efficient optimization methods to increase the speed.

For the first encoding layer $E_1$, the inputted data is the text feature representation sequence outputted by the token embedding. Therefore, in the encoding layer $E_1$, the text feature representation sequence may be used as the historical text encoded sequence, and the first attention matrix may be set as a zero matrix. Its calculation process is the same as that of the encoding layer $E_{i+1}$ above, and will not be repeated here.

S103: Generate a target text encoded sequence of the encoding layer $E_{i+1}$ according to the second attention matrix and the historical text encoded sequence, and generate synthesized speech data matched with the text input sequence based on the target text encoded sequence.

As described above, the second attention matrix serves as the attention parameters used in the process that the encoding layer $E_{i+1}$ encodes the historical text encoded sequence, and with the attention indication of the second attention matrix, the encoding layer $E_{i+1}$ performs encoding to obtain the corresponding target encoded sequence.

The computer device determines the target text encoded sequence corresponding to the text input sequence through the encoder in the residual attention acoustic model. The residual attention acoustic model may generate speech data based on the target text encoded sequence. The target text encoded sequence, serving as the quantized representation obtained by encoding the text input sequence by the encoding layer $E_i$, can accurately reflect the semantic information of the text input sequence and relevant information for synthesizing speech and identify the association between the text in the text input sequence and the phonemes, so that clear and fluent synthesized speech data can be obtained after the decoder decodes the target text encoded sequence based on the residual attention acoustic model.

For example, the target text encoded sequence of the encoding layer $E_{i+1}$ may be generated according to the second attention matrix and the historical text encoded sequence. First, the second attention matrix and the historical text encoded sequence obtained in S102 above may be multiplied to obtain a first intermediate encoded sequence. The specific calculation formula is as follows:

ResidualMultiHead($Q,K,V$,Prev)=Concat(head$_1$, . . . , head$_h$)$W^O$.

Prev represents the first attention matrix, and $W^O$ represents the historical text encoded sequence. Combined with the calculation formula in S102 above, head$_i$=ResidualAttention($QW_i^Q$, $KW_i^K$, $VW_i^V$, Prev$_i$), assuming that the first multi-head self-attention network includes h first single-head self-attention networks (h is an integer greater than 1), then sub-attention matrix head$_1$ of the 1$^{st}$ first single-head self-attention network, the sub-attention matrix head$_2$ of the 2$^{nd}$ first single-head self-attention network, . . . , and the sub-attention matrix head$_h$ of the h$^{th}$ first single-head self-attention network are concatenated using Concat function to obtain the second attention matrix, and the second attention matrix is multiplied by the historical text encoded sequence $W^O$ to obtain the first intermediate encoded sequence. Further, referring to FIG. 4b again, as shown in FIG. 4b, after residual connection and normalization processing are performed on the first intermediate encoded sequence and the historical text encoded sequence, a second intermediate encoded sequence may be obtained. Then, the second intermediate encoded sequence may be inputted into the first convolutional network of the encoding layer $E_{i+1}$, and a third intermediate encoded sequence may be outputted through the first convolutional network. Further, residual connection and normalization processing are performed on the third intermediate encoded sequence and the second intermediate encoded sequence to finally obtain the current text encoded sequence of the encoding layer $E_{i+1}$. When the current text encoded sequence is the text encoded sequence outputted by the N$^{th}$ encoding layer (i.e., the last encoding layer), for the convenience of distinguishing, the current text encoded sequence may be determined as the target text encoded sequence (also referred to as character/phone hidden state sequence). In some embodiments, the first convolutional network may be composed of two layers of one-dimensional convolutional networks with a Rectified Linear Unit (ReLU) activation function or other activation functions (such as Sigmod function, Tanh function, etc.) to add a nonlinear factor so as to perform nonlinear change on the second intermediate encoded sequence, which is not limited in the embodiment of the present disclosure. As can be seen from FIG. 4b, the residual connection and the normalization processing (referred to as Add & Norm) are performed on each layer in the network structure of the entire encoder, which can better optimize the deep network.

After the target text encoded sequence is obtained by the parallel encoding of the encoder, the synthesized speech data matched with the text input sequence may be generated based on the target text encoded sequence. Referring to FIG. 4a again, the target text encoded sequence is sequentially processed by the duration predictor, the length regulator, the decoder and the first linear layer such that an acoustic feature sequence is outputted, and the synthesized speech data may be obtained based on the acoustic feature sequence. For example, the length of the target text encoded sequence is not matched with the length of the acoustic feature sequence. The length of the target text encoded sequence is generally less than the length of the acoustic feature sequence, and the Encoder-Attention-Decoder mechanism commonly used in the existing autoregressive model may lead to misalignment between phonemes and Mel-Spectrogram, further resulting in repeated words and missing words in the generated speech. Therefore, in order to solve this problem in the embodiment of the present disclosure, the length regulator is used to align the lengths of the target text encoded sequence and the acoustic feature sequence. In the reasoning process, since the duration information of the characters/phonemes (that is, the length of the acoustic feature sequence of each character/phone aligned therewith) is not given, the duration predictor is also needed to predict the duration of each character/phone.

Figure 5:
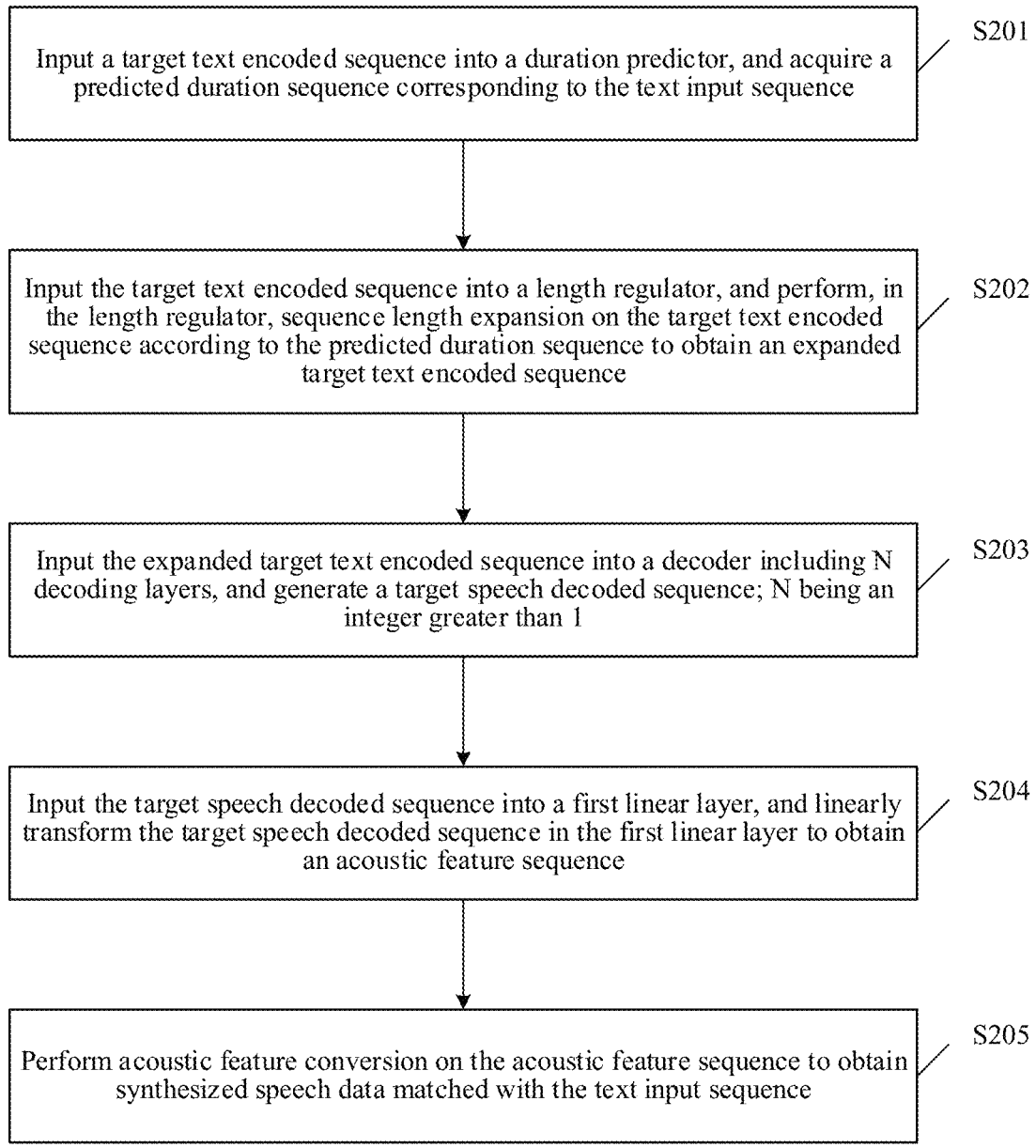
FIG. 5 is a schematic flowchart of a speech synthesis method provided by an embodiment of the present disclosure.

For the specific process of generating speech data, reference can be made to FIG. 5. FIG. 5 is a schematic flowchart of a speech synthesis method provided by an embodiment of the present disclosure. As shown in FIG. 5, the speech synthesis method includes S201-S205 as follows, and S201-S205 correspond to a specific embodiment of S103 in the embodiment of FIG. 3. The speech synthesis process includes the following steps:

S201: Input the target text encoded sequence into a duration predictor, and acquire a predicted duration sequence corresponding to the text input sequence.

For example, referring to the duration predictor in FIG. 4a again, the duration predictor may include two layers of one-dimensional convolutional networks activated by ReLU activation function (or other activation function) and a second linear layer. The duration predictor, which is stacked on the top of the encoder, may be used as a module independent of the residual attention acoustic model and jointly trained end-to-end with the residual attention acoustic model, or may be directly used as a module in the residual attention acoustic model to predict the duration information corresponding to each character or phone.

The computer device may input the target text encoded sequence into the $1^{st}$ one-dimensional convolutional network in the duration predictor such that feature extraction and normalization processing are performed to obtain a first duration feature. Then, the first duration feature may be inputted into the $2^{nd}$ one-dimensional convolutional network such that feature extraction and normalization processing are performed again to obtain a second duration feature. Further, the second duration feature may be inputted into the second linear layer, and the second duration feature may be linearly transformed by the second linear layer to output a scalar, thereby obtaining the predicted duration sequence corresponding to the text input sequence. The predicted duration sequence includes at least two duration parameters used for representing duration information corresponding to each character or phone.

S202: Input the target text encoded sequence into the length regulator, and perform, in the length regulator, sequence length expansion on the target text encoded sequence according to the predicted duration sequence to obtain an expanded target text encoded sequence.

For example, the target text encoded sequence includes at least two encoded vectors. Therefore, the computer device may input the target text encoded sequence into the length regulator. In the length regulator, the encoded vectors are respectively replicated according to the at least two duration parameters in the predicted duration sequence to obtain replicated encoded vectors. Further, the replicated encoded vectors may be concatenated with the target text encoded sequence to obtain the expanded target text encoded sequence. The sequence length of the expanded target text encoded sequence is equal to the sum of the at least two duration parameters.

For example, the target text encoded sequence is denoted as $H=[h_1, h_2, \ldots, h_n]$, where n is the length of the target text encoded sequence, and hi represents the $i^{th}$ encoded vector in the target text encoded sequence. The predicted duration sequence is denoted as $D=[d_1, d_2, \ldots, d_n]$, where $\Sigma_{i=1}^{n} d_i=m$, m being the length of the corresponding acoustic feature sequence. Assuming given $H=[h_1, h_2, h_3]$ and $D=[2, 3, 1]$, then the expanded target text encoded sequence becomes $H'=[h_1, h_1, h_2, h_2, h_2, h_3]$. That is, the length regulator replicates the encoded vector $h_1$ once, replicates the encoded vector $h_2$ twice, and does not replicate the encoded vector $h_3$.

S203: Input the expanded target text encoded sequence into a decoder including N decoding layers, and generate a target speech decoded sequence.

For example, in the residual attention acoustic model, the structure of the decoder is the same as the network structure of the encoder as shown in FIG. 4b, i.e., also combines residual multi-head self-attention layers and one-dimensional convolution. The residual multi-head self-attention layer decoded the inputted information through the multi-head self-attention network, as shown in FIG. 4b, that is, each decoding layer includes a multi-head self-attention network and a one-dimensional convolutional network (the multi-head self-attention network in each decoding layer may be referred to as the second multi-head self-attention network), and the two networks use one residual connection. Each multi-head self-attention network includes at least two single-head self-attention networks (each single-head self-attention network in the second multi-head self-attention network may be referred to as the second single-head self-attention network). The decoder includes the N decoding layers (the number of which is the same as that of the encoding layers in the encoder). In various embodiments, N may be adjusted according to the corpus size.

It is assumed that the N decoding layers include a decoding layer $D_j$ and a decoding layer $D_{j+1}$, and the decoding layer $D_{j+1}$ is a next decoding layer of the decoding layer $D_j$, j being a positive integer, and j being less than N. In order to obtain the decoding result of the decoding layer $D_{j+1}$, first, it is required to generate the attention matrix of the decoding layer $D_{j+1}$ based on the output result of the previous decoding layer, which is called the fourth attention matrix. That is, it is required to acquire the third attention matrix and the historical speech decoded sequence outputted by the decoding layer $D_j$, so that the decoding layer $D_{j+1}$ can generate the fourth attention matrix of the decoding layer $D_{j+1}$ according to the residual connection between the third attention matrix and the second multi-head self-attention network in the decoding layer $D_{j+1}$ and the historical text encoded sequence. The specific process may include: First, the third attention matrix and the historical speech decoded sequence outputted by the decoding layer $D_j$ are acquired. The historical speech decoded sequence may include second matching matrices respectively corresponding to the at least two second single-head self-attention networks. The second matching matrix here includes a Query matrix, a Key matrix and a Value matrix corresponding to the second multi-head self-attention network. Similarly, the 3 matrices may be initialized according to the historical speech decoded sequence, that is, for each second single-head self-attention network, the corresponding Query matrix, Key matrix and Value matrix are respectively equal to the historical speech decoded sequence outputted by the decoding layer $D_j$. Further, a first mapping matrix corresponding to the second multi-head self-attention network in the decoding layer $D_{j+1}$ may be acquired. The second mapping matrix is used for mapping the second matching matrix into different forms. In various embodiments, the second mapping matrix also includes three different matrices, namely a mapping matrix corresponding to the Query matrix, a mapping matrix corresponding to the Key matrix and a mapping matrix corresponding to the Value matrix. The process of generating the second mapping matrix is the same as the process of generating the first mapping matrix in S102 above, and will not be repeated here.

Before calculating the fourth attention matrix, it is required to calculate a sub-attention matrix respectively corresponding to each second single-head self-attention network in the decoding layer $D_{j+1}$ according to the residual connection among the second mapping matrix, the second matching matrix and the third attention matrix. For the specific calculation formula, reference can be made to the calculation formula of the sub-attention matrix in S102. Further, the sub-attention matrices corresponding to all the second single-head self-attention networks are concatenated using Concat function, and a linear transformation is performed to obtain the fourth attention matrix of the decoding layer $D_{j+1}$.

For the first decoding layer $D_1$, the inputted data is the expanded target text encoded sequence. Therefore, in the decoding layer $D_1$, the expanded target text encoded sequence may be used as the historical speech decoded sequence, and the third attention matrix may be set as a zero matrix. Its calculation process is the same as that of the decoding layer $D_{j+1}$ above, and will not be repeated here.

Further, the target speech decoded sequence of the decoding layer $D_{j+1}$ may be generated according to the fourth attention matrix and the historical speech decoded sequence. The specific process includes: The fourth attention matrix and the historical speech decoded sequence are multiplied to obtain a first intermediate decoded sequence (for the specific calculation formula, reference can be made to the calculation formula of the first intermediate encoded sequence above), residual connection and normalization processing are performed on the first intermediate decoded sequence and the historical speech decoded sequence to obtain a second intermediate decoded sequence, the second intermediate decoded sequence is inputted into the second convolutional network in the decoding layer $D_{j+1}$ such that a third intermediate decoded sequence may be outputted by the second convolutional network, and then residual connection and normalization processing are performed on the third intermediate decoded sequence and the second intermediate decoded sequence to finally obtain the current speech decoded sequence of the decoding layer $D_{j+1}$. When the current speech decoded sequence is the speech decoded sequence outputted by the $N^{th}$ decoding layer (i.e., the last decoding layer), for the convenience of distinguishing, the current speech decoded sequence may be determined as the target speech decoded sequence. In some embodiments, the second convolutional network may be composed of two layers of one-dimensional convolutional networks with ReLU activation function.

In various embodiments, like the encoder, the decoding processes of the decoder are also parallel. Since the structure of the encoder or decoder in the typical Transformer-based speech synthesis acoustic model is similar to that of the encoder or decoder in the present disclosure, the method provided by the present disclosure can be naturally expanded to any Transformer-based speech synthesis acoustic model, including the autoregressive Transformer acoustic model.

S204: Input the target speech decoded sequence into a first linear layer, and linearly transform the target speech decoded sequence in the first linear layer to obtain an acoustic feature sequence.

For example, as shown in FIG. 4a, the target speech decoded sequence obtained by the parallel decoding of the decoder is inputted into the first linear layer, and the target speech decoded sequence is linearly transformed by the first linear layer, so that the acoustic feature sequence corresponding to the text input sequence can be obtained. In the embodiment of the present disclosure, the acoustic feature sequence may specifically be a Mel-Spectrogram sequence.

S205: Perform acoustic feature conversion on the acoustic feature sequence to obtain the synthesized speech data matched with the text input sequence.

For example, the computer device may perform acoustic feature conversion on the acoustic feature sequence using a pre-trained vocoder, so that the acoustic feature sequence can be converted into the synthesized speech data matched with the text input sequence. For example, the vocoder may be a WaveGlow network (a flow-based network capable of generating high-quality speech from Mel-spectrograms), which can realize parallel speech synthesis, or may be a SqueezeWave network (a lightweight flow model that can be used for speech synthesis at the mobile terminal), which can effectively increase the speech synthesis speed, or may be a vocoder such as Griffin-Lim, WaveNet and Parallel to synthesize speech from the acoustic feature sequence. An appropriate vocoder may be selected according to actual needs, which is not limited in the embodiment of the present disclosure.

The sound quality of the synthesized speech data may be evaluated by an MOS (Mean Opinion Score) test. The MOS is used for measuring the naturalness (how closely the sound is like human speech) and quality of sound. The method according to the embodiment of the present disclosure effectively improves the clarity and naturalness of the synthesized speech, and the sound quality of the synthesized speech is comparable to that of the speech generated by the autoregressive Transformer TTS and Tacotron2.

In addition, the traditional autoregressive acoustic model automatically generates Mel-Spectrograms one by one, but does not explicitly utilizes the alignment between text and speech, so that it is usually difficult to directly control the rate and prosody of the synthesized speech in the autoregressive generation. The embodiment of the present disclosure uses a non-autoregressive seq-to-seq model which does need to rely on the input of the previous time step, so that the entire model can work parallelly in deed and can support explicit control on the speech rate or prosodic pause of the synthesized speech data. For example, a speech regulating parameter a (length regulating mechanism) is introduced, so that the user can regulate the speech rate or prosody of the synthesized speech data by regulating the speech regulating parameter a. In the length regulator, first, the speech regulating parameter is acquired, then the predicted duration sequence may be updated according to the speech regulating parameter to obtain an updated predicted duration sequence, and further, the speech rate or prosody of the synthesized speech data may be regulated according to the updated predicted duration sequence. That is, the duration of characters/phonemes may be extended or shortened proportionally to control the rate of the synthesized speech, thereby determining the length of the generated Mel-Spectrogram; or pauses between words may be controlled by adjusting the duration of space characters in the sentence, i.e. adding spaces between adjacent characters/phonemes, thereby adjusting part of the prosody of the synthesized speech.

Figure 6:
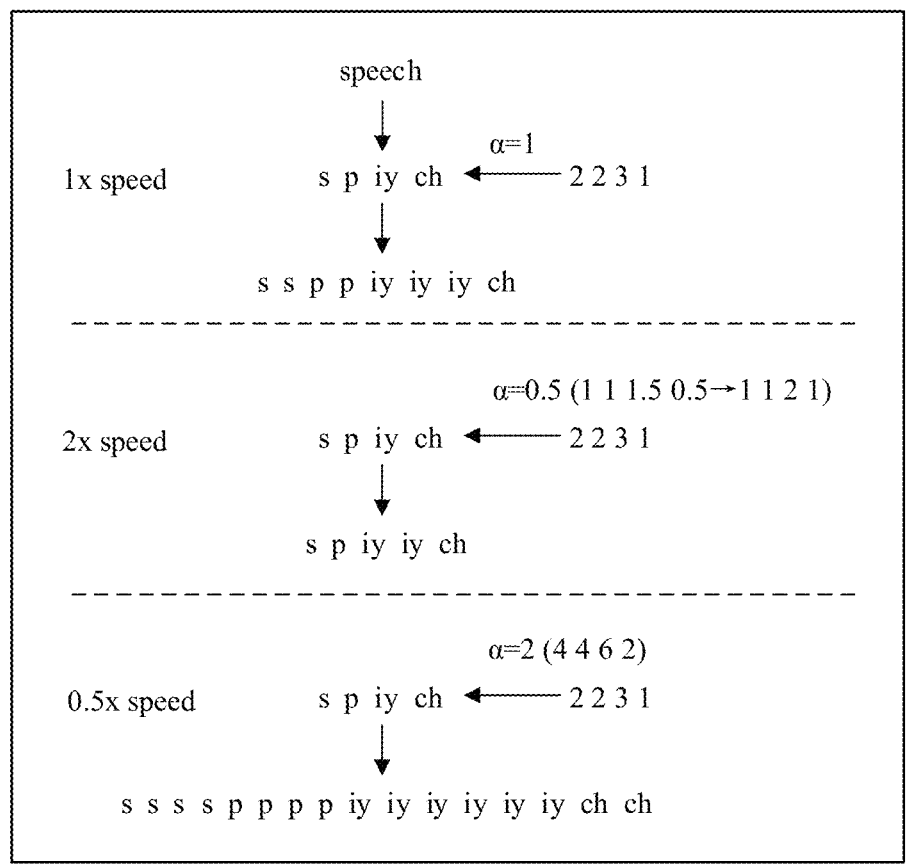
FIG. 6 is a schematic scenario diagram of speech regulating provided by an embodiment of the present disclosure.

Referring to FIG. 6, which is a schematic scenario diagram of speech regulating provided by an embodiment of the present disclosure. FIG. 6 shows a scenario of adjusting the rate of synthesized speech of an English word "speech". The phone sequence corresponding to the word "speech" is P=[s p iy ch], which can be used for indicating the corresponding pronunciation. If the speech regulating parameter a is set to 1, then the predicted duration sequence is D1=[2, 2, 3, 1]. Therefore, the phone sequence corresponding to the word "speech" can be expanded to P1=[s s p p iy iy iy ch], which indicates that the speech rate corresponding to the current word "speech" is 1× speed (that is, the normal speech rate). If the user wants to synthesize faster speech, he may reduce the speech regulating parameter a a little. For example, when the speech regulating parameter a is set to 0.5, the corresponding predicted duration sequence will be updated to D2=0.5*[2, 2, 3, 1]=[1, 1, 1.5, 0.5], rounded to get D2=[1, 1, 2, 1], and the phone sequence corresponding to the word "speech" is correspondingly updated to P2=[s p iy iy ch]. Compared to the sequence P1, the sequence P2 is shorter, and thus can realize faster pronunciation. If the user wants to synthesize slower speech, he may increase the speech regulating parameter a a little. For example, when the speech regulating parameter a is set to 2, the corresponding predicted duration sequence will be updated to D3=2*[2, 2, 3, 1]=[4, 4, 6, 2], and the phone sequence corresponding to the word "speech" is correspondingly updated to P3=[s s s s p p p p iy iy iy iy iy iy ch ch]. Compared with the sequence P1, the sequence P3 is longer, and thus can realize slower pronunciation.

It is to be understood that all the numbers shown in the embodiment of the present disclosure are exemplary, and in actual application, actual numbers may be same or different according to various embodiments of the present disclosure.

According to the embodiments of the present disclosure, based on the deep neural network, the text input sequence may be converted into the text feature representation sequence, and then the text feature representation sequence may be inputted into the encoder including the N encoding layers. In the encoder, when calculating the attention matrix of the current encoding layer, the second attention matrix of the current encoding layer may be generated according to the residual connection between the first attention matrix outputted by the previous encoding layer and the multi-head self-attention network in the current encoding layer and the historical text encoded sequence outputted by the previous encoding layer. Further, the target text encoded sequence of the current encoding layer may be generated according to the obtained second attention matrix and the historical text encoded sequence. Finally, length regulation, decoding, linear transform and acoustic feature conversion may be performed based on the target text encoded sequence to generate the synthesized speech data matched with the text input sequence. As can be seen, in the process of synthesizing speech data, the embodiments of the present disclosure can fully utilize the calculation results of each network, and the residual is put into the attention matrix, i.e., residual connection is performed on the attention matrix of each layer, so that the attention matrix of each layer can communicate with each other, which effectively accelerates the convergence of the model and makes the attention matrix of each network tend to be the same, thereby improving the clarity and stability of the synthesized speech. Compared with the existing speech synthesis solutions, the speech synthesized according to the embodiments of the present disclosure has better clarity and naturalness, and also has clearer spectral details. In addition, the embodiments of the present disclosure can well alleviate the problems of pronunciation errors, intonation errors and unnatural prosody in the existing solutions.

Figure 7:
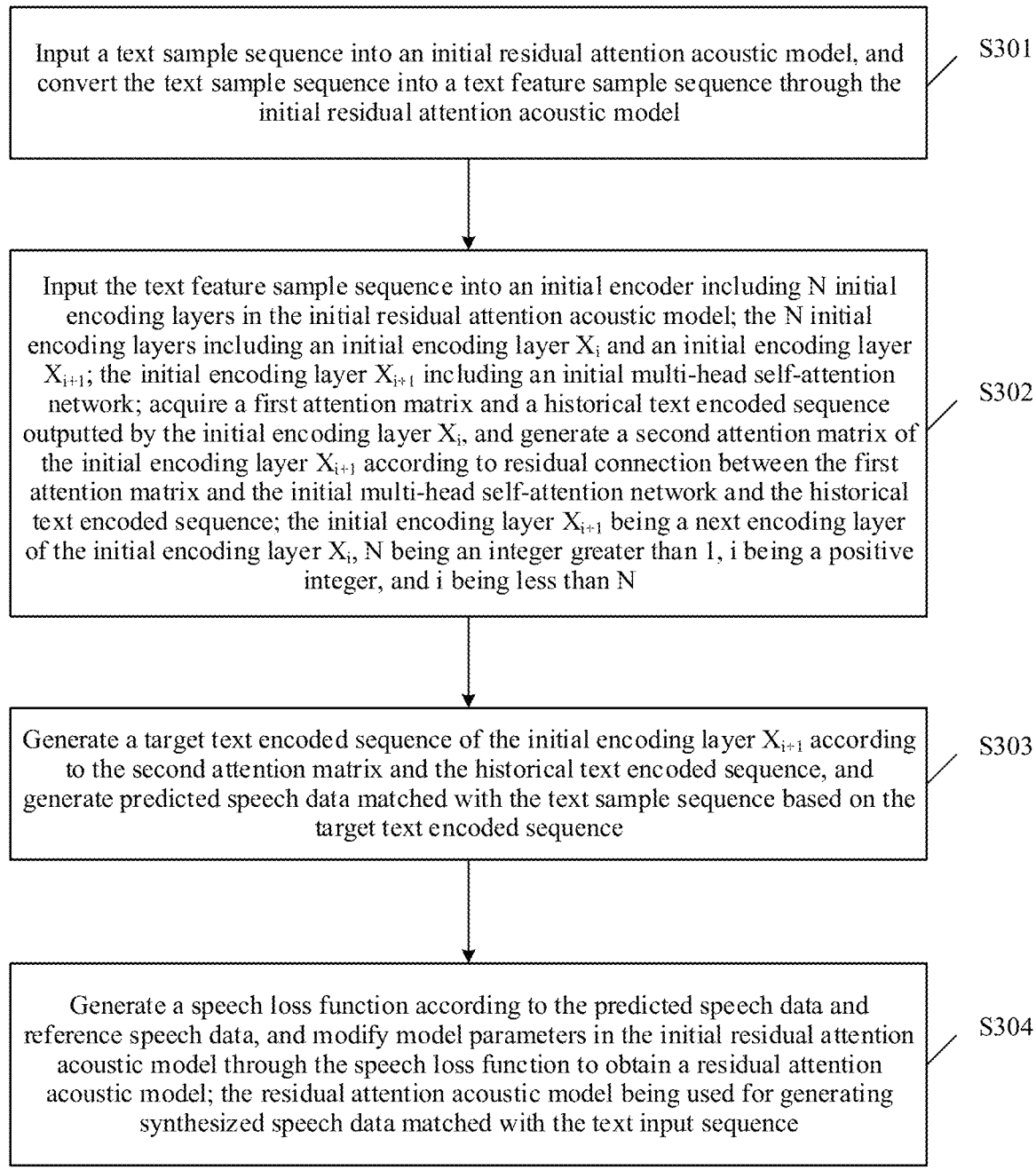
FIG. 7 is a schematic flowchart of a speech synthesis method provided by an embodiment of the present disclosure.

Referring to FIG. 7, which is a schematic flowchart of a speech synthesis method provided by an embodiment of the present disclosure. The speech synthesis method may be executed by a computer device. The computer device may include a terminal device or a service server as shown in FIG. 1. The speech synthesis method may include at least S301-S304 as follows:

S301: Input a text sample sequence into an initial residual attention acoustic model, and convert the text sample sequence into a text feature sample sequence through the initial residual attention acoustic model.

For example, the computer device may select a part of massive sample data for model training. The selected sample data serve as a dataset. The dataset includes reference speech data and corresponding text records that are used for training the model. Besides, the remaining data in the dataset can be divided into a test set and a validation set that are respectively used for validating the generalization performance of the model and adjusting the hyperparameters of the model, which will not be described in detail here. These text records are subjected to text preprocessing to obtain the text sample sequence, and then the text sample sequence is inputted into an initial token embedding in the initial residual attention acoustic model. A vector conversion table is constructed in advance according to the service needs, so the initial token embedding may be used for looking up in the vector conversion table, and then the feature vector matched with the text sample sequence is used as the text feature sample sequence.

S302: Input the text feature sample sequence into an initial encoder including N initial encoding layers in the initial residual attention acoustic model; the N initial encoding layers including an initial encoding layer $X_i$ and an initial encoding layer $X_{i+1}$; the initial encoding layer $X_{i+1}$ including an initial multi-head self-attention network; acquire a first attention matrix and a historical text encoded sequence outputted by the initial encoding layer $X_i$, and generate a second attention matrix of the initial encoding layer $X_{i+1}$ according to residual connection between the first attention matrix and the initial multi-head self-attention network and the historical text encoded sequence; the initial encoding layer $X_{i+1}$ being a next encoding layer of the initial encoding layer $X_i$, N being an integer greater than 1, i being a positive integer, and i being less than N.

For example, the initial residual attention acoustic model is configured with the initial encoder including the N initial encoding layer, and N is an integer greater than 1. In various embodiments, N may be adjusted according to the corpus size. Each initial encoding layer in the initial encoder has the same structure. For the specific network structure of the initial encoding layer, reference can be made to the schematic structural diagram as shown in FIG. 4*b*. Each initial encoding layer includes a multi-head self-attention network and a one-dimensional convolutional network (the multi-head self-attention network in each initial encoding layer may be referred to as the initial multi-head self-attention network), and the two networks use one residual connection. Each multi-head self-attention network includes at least two single-head self-attention networks (each single-head self-attention network in the initial multi-head self-attention network may be referred to as the initial single-head self-attention network). It is assumed that the N initial encoding layers include an initial encoding layer $X_i$ and an initial encoding layer $X_{i+1}$, and the initial encoding layer $X_{i+1}$ is a next encoding layer of the initial encoding layer $X_i$, i being a positive integer, and i being less than N. In order to obtain the encoding result of the initial encoding layer $X_{i+1}$, first, it is required to generate an attention matrix of the initial encoding layer $X_{i+1}$ based on the output result of the previous initial encoding layer, which is referred to as the second attention matrix. The specific process includes: First, the first attention matrix and the historical text encoded sequence outputted by the initial encoding layer $X_i$ are acquired, and then the matching matrix may be initialized according to the historical text encoded sequence. The matching matrix includes a Query matrix, a Key matrix and a Value matrix corresponding to the initial multi-head self-attention network. For each initial single-head self-attention network, the corresponding Query matrix, Key matrix and Value matrix are respectively equal to the historical text encoded sequence outputted by the initial encoding layer $X_i$. Further, a mapping matrix corresponding to the initial multi-head self-attention network may be acquired. The mapping matrix is used for mapping the matching matrix into different forms. In various embodiments, the mapping matrix also includes three different matrices, namely a mapping matrix $W^Q$ corresponding to the Query matrix, a mapping matrix $W^K$ corresponding to the Key matrix and a mapping matrix $W^V$ corresponding to the Value matrix. The mapping matrix $W^Q$, the mapping matrix $W^K$ and mapping matrix $W^V$ may all obtained by random initialization and relevant network optimization. Therefore, for each initial single-head self-attention network, these three mapping matrices are different.

Further, a sub-attention matrix corresponding to each initial single-head self-attention network in the initial encoding layer $X_{i+1}$ may be calculated according to the residual connection among the mapping matrix, the matching matrix and the first attention matrix. The sub-attention matrices corresponding to all the initial single-head self-attention networks are concatenated, and a linear transformation is performed to obtain the second attention matrix of the initial encoding layer $X_{i+1}$.

For a more specific process of this step, reference can be made to S102 in the above embodiment corresponding to FIG. 3, and the details will not be repeated here.

For the first initial encoding layer $X_i$, the inputted data is the text feature sample sequence outputted by the initial token embedding. Therefore, in the initial encoding layer $X_i$, the text feature sample sequence may be used as the historical text encoded sequence, and the first attention matrix may be set as a zero matrix. Its calculation process is the same as that of the initial encoding layer $X_{i+1}$ above, and will not be repeated here.

S303: Generate a target text encoded sequence of the initial encoding layer $X_{i+1}$ according to the second attention matrix and the historical text encoded sequence, and generate predicted speech data matched with the text sample sequence based on the target text encoded sequence.

For example, the computer device may multiply the second attention matrix and the historical text encoded sequence obtained in S302 to obtain a first intermediate encoded sequence. After residual connection and normalization processing are performed on the first intermediate encoded sequence and the historical text encoded sequence, a second intermediate encoded sequence may be obtained. Then, the second intermediate encoded sequence may be inputted into the initial convolutional network of the initial encoding layer $X_{i+1}$, and a third intermediate encoded sequence may be outputted through the initial convolutional network. Further, residual connection and normalization processing are performed on the third intermediate encoded sequence and the second intermediate encoded sequence to finally obtain the current text encoded sequence of the initial encoding layer $X_{i+1}$. It When the current text encoded sequence is the text encoded sequence outputted by the $N^{th}$ initial encoding layer (i.e., the last initial encoding layer), for the convenience of distinguishing, the current text encoded sequence may be determined as the target text encoded sequence. The initial convolutional network may be composed of two layers of one-dimensional convolutional networks with a ReLU activation function or other activation functions (such as Sigmod function, Tanh function, etc.), which is not limited in the embodiment of the present disclosure.

After the target text encoded sequence is obtained by the parallel encoding of the initial encoder, the synthesized speech data matched with the text sample sequence may be generated based on the target text encoded sequence. The target text encoded sequence is sequentially processed by an initial duration predictor, an initial length regulator, an initial decoder including N initial decoding layers and an initial linear layer in the initial residual attention acoustic model such that an acoustic feature sequence is outputted, and acoustic feature conversion is performed on the acoustic feature sequence using an initial vocoder to obtain the predicted speech data. For the specific process of generating the predicted speech data, reference can be made to the above embodiment corresponding to FIG. 5, and the details will not be repeated here. The network structure of the initial decoder is the same as that of the initial encoder above.

S304: Generate a speech loss function according to the predicted speech data and reference speech data, and modify model parameters in the initial residual attention acoustic model through the speech loss function to obtain a residual attention acoustic model; the residual attention acoustic model being used for generating synthesized speech data matched with the text input sequence.

For example, the computer device may generate the speech loss function (for example, mean-square error loss function) (used for representing the difference between the synthesized predicted speech data and the real reference speech data) according to the predicted speech data and reference speech data corresponding to the text sample sequence, and then modify the model parameters in the initial residual attention acoustic model through the speech loss function, so as to obtain the trained residual attention acoustic model. The residual attention acoustic model is used for generating the synthesized speech data matched with the text input sequence. The residual attention acoustic model may include a trained token embedding, an encoder, a duration predictor, a length regulator, a decoder, a linear layer and a vocoder. The duration predictor and the vocoder may be used both as a part of the model and modules independent of the model. When the duration predictor and the vocoder are used as the independent modules, they may be jointly trained end-to-end with the residual attention acoustic model.

Figure 8:
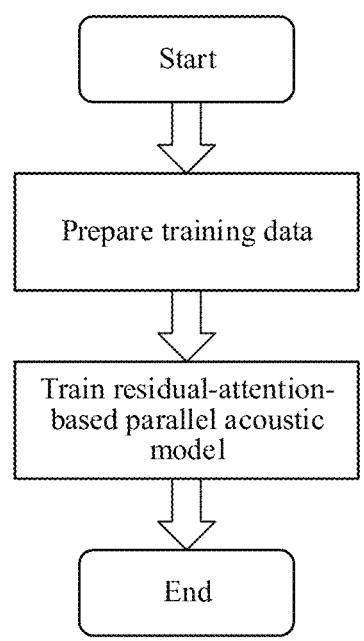
FIG. 8 is a schematic flowchart of model training provided by an embodiment of the present disclosure.

Referring to FIG. 8, which is a schematic flowchart of model training provided by an embodiment of the present disclosure. As shown in FIG. 8, the schematic flowchart mainly includes two parts. The first part is data preparation, including text preprocessing, acoustic feature extraction and phone duration information extraction. The second part is to train the residual-attention-based parallel speech synthesis acoustic model (that is, the residual attention acoustic model) using given data (including the text sample sequence obtained after the text preprocessing and the duration information obtained after the phone duration information extraction), thereby building a high-precision parallel acoustic model. The text sample sequence and the reference speech data are inputted into the model for training to obtain encoder-decoder attention alignment, which can be further used for training the duration predictor.

The embodiment of the present disclosure provides the method for building the residual-attention-based parallel speech synthesis acoustic model. The text sample sequence and the reference speech data, which form paired data, are inputted into the initial residual attention acoustic model for training to obtain the predicted speech data matched with the text sample sequence. Further, in order to improve the speech synthesis accuracy and efficiency by the model, the model parameters in the initial residual attention acoustic model may be modified according to the speech loss function generated from the predicted speech data and the reference speech data, so that a high-precision residual attention acoustic model can be obtained. The acoustic model can predict acoustic parameters accurately, stably and efficiently. In addition, the acoustic model obtained by this method can be applied to any scenario where text needs to be converted into speech. Compared with the existing speech synthesis solution, the speech synthesized using this acoustic model has better clarity and naturalness, and also has clearer spectral details. Besides, this acoustic model can well alleviate the problems of pronunciation errors, intonation errors and unnatural prosody in the existing solutions. Moreover, this acoustic model can be naturally expanded to any language, dialect, speaker and adaptive related speech synthesis tasks to improve the Transformer structure used therein, thereby having good expansibility.

Figure 9:
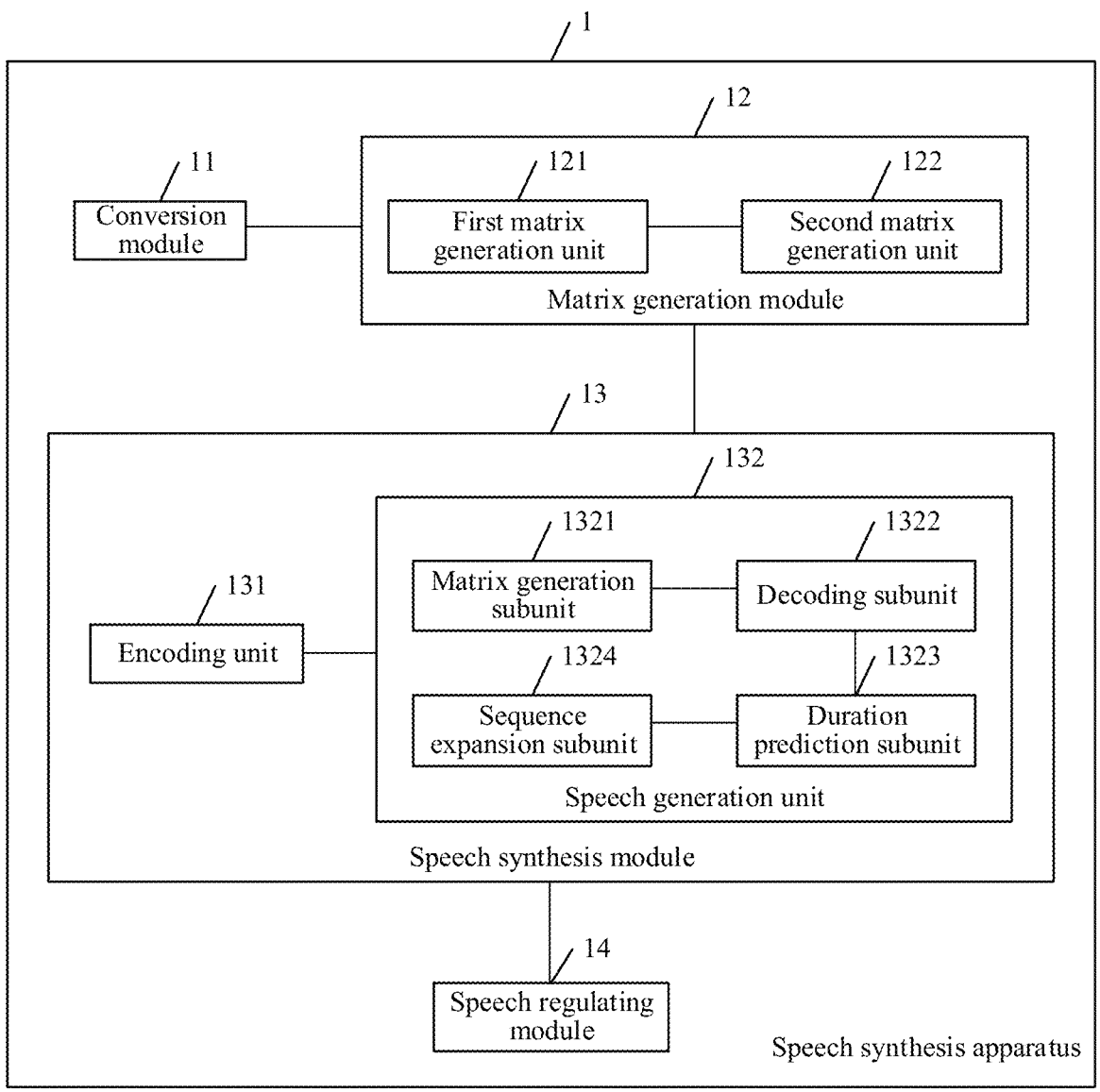
FIG. 9 is a schematic structural diagram of a speech synthesis apparatus provided by an embodiment of the present disclosure.

Referring to FIG. 9, which is a schematic structural diagram of a speech synthesis apparatus provided by an embodiment of the present disclosure. The speech synthesis apparatus may be a computer program (including program codes) running on a computer device, for example, the speech synthesis apparatus is application software. The apparatus may be used to execute corresponding steps in the speech synthesis method according to the embodiment of the present disclosure. As shown in FIG. 9, the speech synthesis apparatus 1 may include: a conversion module 11, a matrix generation module 12 and a speech synthesis module 13.

The conversion module 11 is configured to convert a text input sequence into a text feature representation sequence.

The conversion module 11 is further configured to input the text input sequence into a token embedding, look up in a vector conversion table through the token embedding, and thereby using a feature vector matched with the text input sequence as the text feature representation sequence. The vector conversion table includes a mapping relationship between characters or phonemes and feature vectors.

The matrix generation module 12 is configured to input the text feature representation sequence into an encoder including N encoding layers; the N encoding layers including an encoding layer $E_i$ and an encoding layer $E_{i+1}$; the encoding layer $E_{i+1}$ including a first multi-head self-attention network; acquire a first attention matrix and a historical text encoded sequence outputted by the encoding layer $E_i$, and generate a second attention matrix of the encoding layer $E_{i+1}$ according to residual connection between the first attention matrix and the first multi-head self-attention network and the historical text encoded sequence; the encoding layer $E_{i+1}$ being a next encoding layer of the encoding layer $E_i$, N being an integer greater than 1, i being a positive integer, and i being less than N.

The speech synthesis module 13 is configured to generate a target text encoded sequence of the encoding layer $E_{i+1}$ according to the second attention matrix and the historical text encoded sequence, and generate synthesized speech data matched with the text input sequence based on the target text encoded sequence.

For the implementation of specific functions of the conversion module 11, reference can be made to S101 in the embodiment corresponding to FIG. 3. For the implementation of specific functions of the matrix generation module 12, reference can be made to S102 in the embodiment corresponding to FIG. 3. For the implementation of specific functions of the speech synthesis module 13, reference can be made to S103 in the embodiment corresponding to FIG. 3 and S201-S205 in the embodiment corresponding to FIG. 5. The details will not be repeated here.

Referring to FIG. 9, the speech synthesis apparatus 1 may further include: a speech regulating module 14.

The speech regulating module 14 is configured to acquire a speech regulating parameter, and update the predicted duration sequence according to the speech regulating parameter to obtain an updated predicted duration sequence; and regulate speech rate or prosody of the synthesized speech data according to the updated predicted duration sequence.

For the implementation of specific functions of the speech regulating module 14, reference can be made to S103 in the embodiment corresponding to FIG. 3. The details will not be repeated here.

In an implementation, the first multi-head self-attention network includes at least two first single-head self-attention networks.

Referring to FIG. 9, the matrix generation module 12 may include: a first matrix generation unit 121 and a second matrix generation unit 122.

The first matrix generation unit 121 is configured to acquire the first attention matrix and the historical text encoded sequence outputted by the encoding layer $E_i$; the historical text encoded sequence including first matching matrices respectively corresponding to the at least two first single-head self-attention networks; and acquire a first mapping matrix corresponding to the first multi-head self-attention network, and generate sub-attention matrices respectively corresponding to the at least two first single-head self-attention networks according to residual connection among the first mapping matrix, the first matching matrix and the first attention matrix.

The second matrix generation unit 122 is configured to concatenate the at least two sub-attention matrices to obtain the second attention matrix of the encoding layer $E_{i+1}$.

For the implementation of specific functions of the first matrix generation unit 121 and the second matrix generation unit 122, reference can be made to S102 in the embodiment corresponding to FIG. 3. The details will not be repeated here.

In an implementation, the encoding layer $E_{i+1}$ includes a first convolutional network.

Referring to FIG. 9, the speech synthesis module 13 may include: an encoding unit 131 and a speech generation unit 132.

The encoding unit 131 is configured to multiply the second attention matrix and the historical text encoded sequence to obtain a first intermediate encoded sequence; perform residual connection and normalization processing on the first intermediate encoded sequence and the historical text encoded sequence to obtain a second intermediate encoded sequence, and input the second intermediate encoded sequence into the first convolutional network to obtain a third intermediate encoded sequence; perform residual connection and normalization processing on the third intermediate encoded sequence and the second intermediate encoded sequence to obtain a current text encoded sequence of the encoding layer $E_{i+1}$; and determine, when the current text encoded sequence is a text encoded sequence of the $N^{th}$ encoding layer, the current text encoded sequence as the target text encoded sequence.

The speech generation unit 132 is configured to input the target text encoded sequence into a duration predictor, and acquire a predicted duration sequence corresponding to the text input sequence; input the target text encoded sequence into the length regulator, and perform, in the length regulator, sequence length expansion on the target text encoded sequence according to the predicted duration sequence to obtain an expanded target text encoded sequence; input the expanded target text encoded sequence into a decoder including N decoding layers, and generate a target speech decoded sequence; input the target speech decoded sequence into a first linear layer, and linearly transform the target speech decoded sequence in the first linear layer to obtain an acoustic feature sequence; and perform acoustic feature conversion on the acoustic feature sequence to obtain the synthesized speech data matched with the text input sequence.

For the implementation of specific functions of the encoding unit 131, reference can be made to S103 in the embodiment corresponding to FIG. 3. For the implementation of specific functions of the speech generation unit 132, reference can be made to S201-S205 in the embodiment corresponding to FIG. 5. The details will not be repeated here.

In an implementation, the N decoding layers include a decoding layer $D_j$ and a decoding layer $D_{j+1}$, the decoding layer $D_{j+1}$ is a next decoding layer of the decoding layer $D_j$, j is a positive integer, and j is less than N; and the decoding layer $D_{j+1}$ includes a second multi-head self-attention network.

Referring to FIG. 9, the speech generation unit 132 may include: a matrix generation subunit 1321, a decoding subunit 1322, a duration prediction subunit 1323 and a sequence expansion subunit 1324.

The matrix generation subunit 1321 is configured to acquire a third attention matrix and a historical speech decoded sequence outputted by the decoding layer $D_j$, and generate a fourth attention matrix of the decoding layer $D_{j+1}$ according to residual connection between the third attention matrix and the second multi-head self-attention network and the historical speech decoded sequence.

In an implementation, the second multi-head self-attention network includes at least two second single-head self-attention networks.

The matrix generation subunit 1321 is further configured to acquire the third attention matrix and the historical speech decoded sequence outputted by the decoding layer $D_j$; the historical speech decoded sequence including second matching matrices respectively corresponding to the at least two single-head self-attention networks; acquire a second mapping matrix corresponding to the second multi-head self-attention network, and generate sub-attention matrices respectively corresponding to the at least two second single-head self-attention networks according to residual connection among the second mapping matrix, the second matching matrix and the third attention matrix; and concatenate the at least two sub-attention matrices to obtain the fourth attention matrix of the decoding layer $D_{j+1}$.

The decoding subunit 1322 is configured to generate the target speech decoded sequence of the decoding layer $D_{j+1}$ according to the fourth attention matrix and the historical speech decoded sequence. When the decoding layer $D_j$ is the first decoding layer, the historical speech decoded sequence of the decoding layer $D_j$ is the expanded target text encoded sequence.

In an implementation, the decoding layer $D_{j+1}$ includes a second convolutional network.

The decoding subunit 1322 is further configured to multiply the fourth attention matrix and the historical speech decoded sequence to obtain a first intermediate decoded sequence; perform residual connection and normalization processing on the first intermediate decoded sequence and the historical speech decoded sequence to obtain a second intermediate decoded sequence, and input the second intermediate decoded sequence into the second convolutional network to obtain a third intermediate decoded sequence; perform residual connection and normalization processing on the third intermediate decoded sequence and the second intermediate decoded sequence to obtain a current speech decoded sequence of the decoding layer $D_{j+1}$; and determine, when the current speech decoded sequence is a speech decoded sequence of the $N^{th}$ decoding layer, the current speech decoded sequence as the target speech decoded sequence.

The duration prediction subunit 1323 is configured to input the target text encoded sequence into the two layers of one-dimensional convolutional networks in the duration predictor to obtain a duration feature; and input the duration feature into the second linear layer, and linearly transform the duration feature through the second linear layer to obtain the predicted duration sequence corresponding to the text input sequence.

In an implementation, the target text encoded sequence includes at least two encoded vectors. The predicted duration sequence includes at least two duration parameters.

The sequence expansion subunit 1324 is configured to input the target text encoded sequence into the length regulator, and replicate, in the length regulator, the at least two encoded vectors according to the at least two duration parameters in the predicted duration sequence to obtain replicated encoded vectors; and concatenate the replicated encoded vectors with the target text encoded sequence to obtain the expanded target text encoded sequence. The sequence length of the expanded target text encoded sequence is equal to the sum of the at least two duration parameters.

For the implementation of specific functions of the matrix generation subunit 1321 and the decoding subunit 1322, reference can be made to S203 in the embodiment corresponding to FIG. 5. For the implementation of specific functions of the duration prediction subunit 1323, reference can be made to S201 in the embodiment corresponding to FIG. 5. For the implementation of specific functions of the sequence expansion subunit 1324, reference can be made to S202 in the embodiment corresponding to FIG. 5. The details will not be repeated here.

According to the embodiments of the present disclosure, the text input sequence may be converted into the text feature representation sequence, and further, the text feature representation sequence may be inputted into the encoder including the N encoding layers. In the encoder, while calculating the attention matrix of the current encoding layer, the second attention matrix of the current encoding layer may be generated according to the residual connection between the first attention matrix outputted by the previous encoding layer and the multi-head self-attention network in the current encoding layer and the historical text encoded sequence outputted by the previous encoding layer, and further, the target text encoded sequence of the current encoding layer may be generated according to the obtained second attention matrix and the historical text encoded sequence. Finally, the synthesized speech data matched with the above text input sequence may be generated based on the target text encoded sequence. As can be seen, in the process of synthesizing speech data, the embodiments of the present disclosure can fully utilize the calculation results of each network, and the residual is put into the attention matrix, i.e., residual connection is performed on the attention matrix of each layer, so that the attention matrix of each layer can communicate with each other, which effectively accelerates the convergence of the model and makes the attention matrix of each network tend to be the same, thereby improving the clarity and stability of the synthesized speech.

Figure 10:
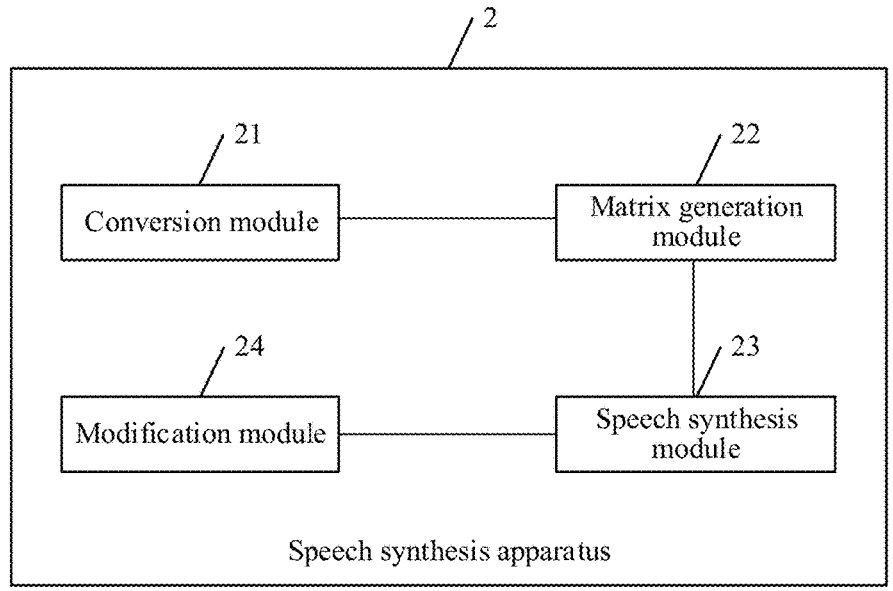
FIG. 10 is a schematic structural diagram of a speech synthesis apparatus provided by an embodiment of the present disclosure.

Referring to FIG. 10, which is a schematic structural diagram of a speech synthesis apparatus provided by an embodiment of the present disclosure. The speech synthesis apparatus may be a computer program (including program codes) running on a computer device, for example, the speech synthesis apparatus is application software. The apparatus may be used to execute corresponding steps in the speech synthesis method according to the embodiment of the present disclosure. As shown in FIG. 10, the speech synthesis apparatus 2 may include: a conversion module 21, a matrix generation module 22, a speech synthesis module 23 and a modification module 24.

The conversion module 21 is configured to input a text sample sequence into an initial residual attention acoustic model, and convert the text sample sequence into a text feature sample sequence through the initial residual attention acoustic model.

The matrix generation module 22 is configured to input the text feature sample sequence into an initial encoder including N initial encoding layers in the initial residual attention acoustic model; the N initial encoding layers including an initial encoding layer $X_i$ and an initial encoding layer $X_{i+1}$; the initial encoding layer $X_{i+1}$ including an initial multi-head self-attention network; acquire a first attention matrix and a historical text encoded sequence outputted by the initial encoding layer $X_i$, and generate a second attention matrix of the initial encoding layer $X_{i+1}$ according to residual connection between the first attention matrix and the initial multi-head self-attention network and the historical text encoded sequence; the initial encoding layer $X_{i+1}$ being a next encoding layer of the initial encoding layer $X_i$, N being an integer greater than 1, i being a positive integer, and i being less than N.

The speech synthesis module 23 is configured to generate a target text encoded sequence of the initial encoding layer $X_{i+1}$ according to the second attention matrix and the historical text encoded sequence, and generate predicted speech data matched with the text sample sequence based on the target text encoded sequence.

The modification module 24 is configured to generate a speech loss function according to the predicted speech data and reference speech data, and modify model parameters in the initial residual attention acoustic model through the speech loss function to obtain a residual attention acoustic model. The residual attention acoustic model is used for generating synthesized speech data matched with the text input sequence.

For the implementation of specific functions of the conversion module 21, reference can be made to S301 in the embodiment corresponding to FIG. 7. For the implementation of specific functions of the matrix generation module 22, reference can be made to S302 in the embodiment corresponding to FIG. 7. For the implementation of specific functions of the speech synthesis module 23, reference can be made to S303 in the embodiment corresponding to FIG. 7. For the implementation of specific functions of the modification module 24, reference can be made to S304 in the embodiment corresponding to FIG. 7. The details will not be repeated here.

The embodiment of the present disclosure provides the method for building the residual-attention-based parallel speech synthesis acoustic model. The text sample sequence and the reference speech data, which form paired data, are inputted into the initial residual attention acoustic model for training to obtain the predicted speech data matched with the text sample sequence. Further, in order to improve the speech synthesis accuracy and efficiency by the model, the model parameters in the initial residual attention acoustic model may be modified according to the speech loss function generated from the predicted speech data and the reference speech data, so that a high-precision residual attention acoustic model can be obtained. The acoustic model can predict acoustic parameters accurately, stably and efficiently. In addition, the acoustic model obtained by this method can be applied to any scenario where text needs to be converted into speech. Compared with the existing speech synthesis solution, the speech synthesized using this acoustic model has better clarity and naturalness, and also has clearer spectral details. Besides, this acoustic model can well alleviate the problems of pronunciation errors, intonation errors and unnatural prosody in the existing solutions. Moreover, this acoustic model can be naturally expanded to any language, dialect, speaker and adaptive related speech synthesis tasks to improve the Transformer structure used therein, thereby having good expansibility.

Figure 11:
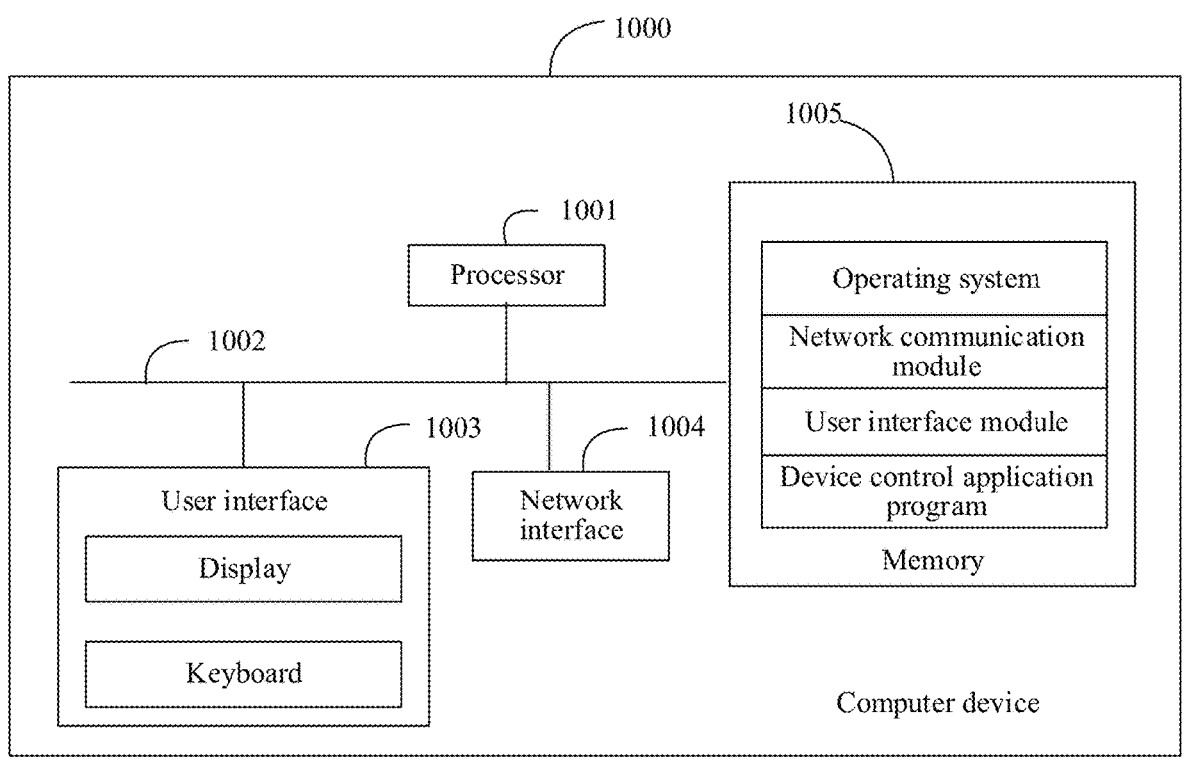
FIG. 11 is a schematic structural diagram of a computer device provided by an embodiment of the present disclosure.

Referring to FIG. 11, which is a schematic structural diagram of a computer device provided by an embodiment of the present disclosure. As shown in FIG. 11, the computer device 1000 may include: a processor 1001, a network interface 1004 and a memory 1005. In addition, the computer device 1000 may further include: a user interface 1003 and at least one communication bus 1002. The communication bus 1002 is configured to realize connection and communication between these components. The user interface 1003 may include a display, a keyboard, and in some embodiments, the user interface 1003 may further include a standard wired interface and a standard wireless interface. In some embodiments, the network interface 1004 may include a standard wired interface and a standard wireless interface (such as a Wi-Fi interface). The memory 1004 may be a high-speed RAM, or a non-volatile memory, such as at least one disk memory. In some embodiments, the memory 1005 may further be at least one storage apparatus away from the foregoing processor 1001. As shown in FIG. 11, the memory 1005 used as a computer-readable storage medium may include an operating system, a network communication module, a user interface module, and a device-control application program.

In the computer device 1000 shown in FIG. 11, the network interface 1004 may provide a network communication function. The user interface 1003 is mainly configured to provide an input interface for a user. The processor 1001 may be configured to call a device control application program stored in the memory 1005, so as to:

convert a text input sequence into a text feature representation sequence;

input the text feature representation sequence into an encoder including N encoding layers; the N encoding layers including an encoding layer $E_i$ and an encoding layer $E_{i+1}$, the encoding layer $E_{i+1}$ being a next encoding layer of the encoding layer $E_i$, N being an integer greater than 1, i being a positive integer, and i being less than N; the encoding layer $E_{i+1}$ including a first multi-head self-attention network;

acquire a first attention matrix and a historical text encoded sequence outputted by the encoding layer $E_i$, and generate a second attention matrix of the encoding layer $E_{i+1}$ according to residual connection between the first attention matrix and the first multi-head self-attention network and the historical text encoded sequence; and generate a target text encoded sequence of the encoding layer $E_{i+1}$ according to the second attention matrix and the historical text encoded sequence, and generate synthesized speech data matched with the text input sequence based on the target text encoded sequence.

The computer device 1000 described in the embodiment of the present disclosure can execute the description of the speech synthesis method in any of the foregoing embodiments corresponding to FIG. 3 and FIG. 5, and the details will not be repeated here. In addition, the description of beneficial effects of the same method is not described herein again.

Figure 12:
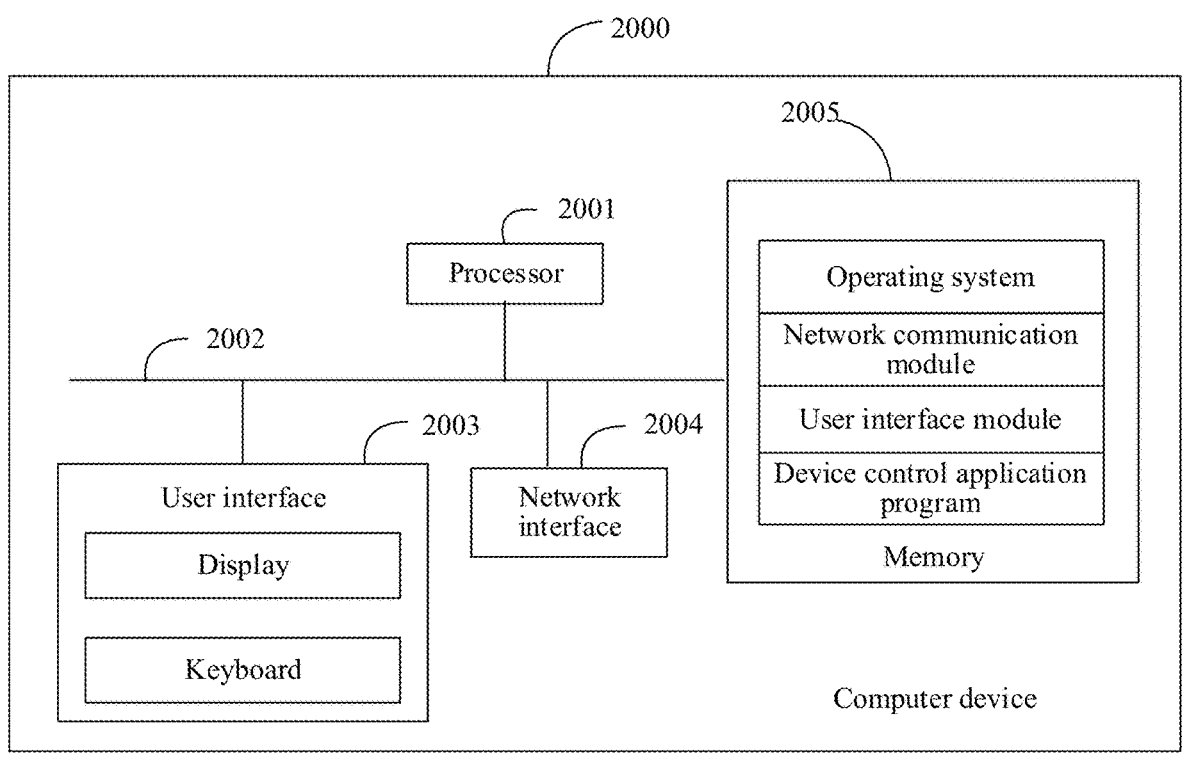
FIG. 12 is a schematic structural diagram of a computer device provided by an embodiment of the present disclosure.

Referring to FIG. 12, which is a schematic structural diagram of a computer device provided by an embodiment of the present disclosure. As shown in FIG. 12, the computer device 2000 may include: a processor 2001, a network interface 2004 and a memory 2005. In addition, the computer device 2000 may further include: a user interface 2003 and at least one communication bus 2002. The communication bus 2002 is configured to implement connection and communication between the components. The user interface 2003 may include a display, a keyboard, and in some embodiments, the user interface 2003 may further include a standard wired interface and a standard wireless interface. In some embodiments, the network interface 2004 may include a standard wired interface and a standard wireless interface (such as a Wi-Fi interface). The memory 2004 may be a high-speed RAM memory, or may be a non-volatile memory, for example, at least one magnetic disk memory. In some embodiments, the memory 2005 may further be at least one storage apparatus away from the foregoing processor 2001. As shown in FIG. 12, the memory 2005 used as a computer-readable storage medium may include an operating system, a network communication module, a user interface module, and a device-control application program.

In the computer device 2000 shown in FIG. 12, the network interface 2004 may provide a network communication function. The user interface 2003 is mainly configured to provide an input interface for a user. The processor 2001 may be configured to call a device control application program stored in the memory 2005, so as to:

input a text sample sequence into an initial residual attention acoustic model, and converting the text sample sequence into a text feature sample sequence through the initial residual attention acoustic model;

input the text feature sample sequence into an initial encoder including N initial encoding layers in the initial residual attention acoustic model; the N initial encoding layers including an initial encoding layer $X_i$ and an initial encoding layer $X_{i+1}$, the initial encoding layer $X_{i+1}$ being a next encoding layer of the initial encoding layer $X_i$, N being an integer greater than 1, i being a positive integer, and i being less than N; the initial encoding layer $X_{i+1}$ including an initial multi-head self-attention network;

acquire a first attention matrix and a historical text encoded sequence outputted by the initial encoding layer $X_i$, and generate a second attention matrix of the initial encoding layer $X_{i+1}$ according to residual connection between the first attention matrix and the initial multi-head self-attention network and the historical text encoded sequence;

generate a target text encoded sequence of the initial encoding layer $X_{i+1}$ according to the second attention matrix and the historical text encoded sequence, and generate predicted speech data matched with the text sample sequence based on the target text encoded sequence; and generate a speech loss function according to the predicted speech data and reference speech data, and modify model parameters in the initial residual attention acoustic model through the speech loss function to obtain a residual attention acoustic model; the residual attention acoustic model being used for generating synthesized speech data matched with the text input sequence.

The computer device 2000 described in the embodiment of the present disclosure can execute the description of the speech synthesis method in the embodiment corresponding to FIG. 7, and the details will not be repeated here. In addition, the description of beneficial effects of the same method is not described herein again.

In addition, the embodiments of the present disclosure further provide a computer-readable storage medium. The computer-readable storage medium stores a computer program executed by the speech synthesis apparatus 1 and the speech synthesis apparatus 2 mentioned above, and the computer program includes program instructions. When executing the program instructions, the processor can perform the descriptions of the speech synthesis method in the embodiment corresponding to any one of FIG. 3, FIG. 5, and FIG. 7. Therefore, details are not described herein again. In addition, the description of beneficial effects of the same method is not described herein again. For technical details that are not disclosed in the embodiments of the computer-readable storage medium of the present disclosure, refer to the method embodiments of the present disclosure.

The embodiments of the present disclosure further provide a computer program product including instructions is further provided. When the computer program product runs on a computer, the computer is caused to perform the method provided in the foregoing embodiments.

The computer-readable storage medium may be the speech synthesis apparatus provided in any one of the foregoing embodiments or an internal storage unit of the computer device, for example, a hard disk or a main memory of the computer device. The computer-readable storage medium may alternatively be an external storage device of the computer device, for example, a removable hard disk, a smart memory card (SMC), a secure digital (SD) card, or a flash card equipped on the computer device. Further, the computer-readable storage medium may further include both an internal storage unit and an external storage device of the computer device. The computer-readable storage medium is configured to store the computer program and another program and data that are required by the computer device. The computer-readable storage medium may further be configured to temporarily store data that has been output or data to be output.

In addition, the embodiments of the present disclosure further provide a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the method in the foregoing embodiment corresponding to any one of FIG. 3, FIG. 5, and FIG. 7.

A person of ordinary skill in the art may be aware that, in combination with examples of units and algorithm steps described in the embodiments disclosed in this specification, the present disclosure may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

The method and the related apparatus provided in the embodiments of the present disclosure are described with reference to method flowcharts and/or schematic structural diagrams provided in the embodiments of the present disclosure. For example, computer program instructions may be used to implement each process and/or each block in the method flowcharts and/or the schematic structural diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The embodiments disclosed herein are exemplary only and are certainly not intended to limit the protection scope of the present disclosure. Other applications, advantages, alternations, modifications, or equivalents to the disclosed embodiments that are obvious to those skilled in the art are intended to be encompassed within the scope of the present disclosure.

What is claimed is:

1. A speech synthesis method, executed by a computer device, the method comprising:
    converting a text input sequence into a text feature representation sequence;
    inputting the text feature representation sequence into an encoder comprising N encoding layers; the N encoding layers comprising an encoding layer $E_i$ and an encoding layer $E_{i+1}$, the encoding layer $E_{i+1}$ being a next encoding layer of the encoding layer $E_i$, N being an integer greater than 1, i being a positive integer, and i being less than N; and the encoding layer $E_{i+1}$ comprising a first multi-head self-attention network and a first convolutional network;
    acquiring a first attention matrix and a historical text encoded sequence outputted by the encoding layer $E_i$, and generating a second attention matrix of the encoding layer $E_{i+1}$ according to residual connection between the first attention matrix and the first multi-head self-attention network, and the historical text encoded sequence;
    generating a target text encoded sequence of the encoding layer $E_{i+1}$ according to the second attention matrix and the historical text encoded sequence, comprising:
        obtaining a second intermediate encoded sequence based on the second attention matrix and the historical text encoded sequence, and inputting the second intermediate encoded sequence into the first convolutional network to obtain a third intermediate encoded sequence;
        performing residual connection and normalization processing on the third intermediate encoded sequence and the second intermediate encoded sequence to obtain a current text encoded sequence of the encoding layer $E_{i+1}$; and
        determining, when the current text encoded sequence is a text encoded sequence of the $N^{th}$ encoding layer, the current text encoded sequence as the target text encoded sequence; and
    generating synthesized speech data matched with the text input sequence based on the target text encoded sequence.

2. The method according to claim 1, wherein the first multi-head self-attention network comprises at least two first single-head self-attention networks; and
    acquiring the first attention matrix and the historical text encoded sequence and generating the second attention matrix of the encoding layer $E_{i+1}$ comprise:
        acquiring the first attention matrix and the historical text encoded sequence that comprises first matching matrices respectively corresponding to the at least two first single-head self-attention networks;
        acquiring a first mapping matrix corresponding to the first multi-head self-attention network, and generating at least two sub-attention matrices respectively corresponding to the at least two first single-head self-attention networks according to residual connection among the first mapping matrix, the first matching matrix and the first attention matrix; and
        concatenating the at least two sub-attention matrices to obtain the second attention matrix of the encoding layer $E_{i+1}$.

3. The method according to claim 1, wherein generating the target text encoded sequence of the encoding layer $E_{i+1}$ according to the second attention matrix and the historical text encoded sequence further comprises:
    multiplying the second attention matrix and the historical text encoded sequence to obtain the first intermediate encoded sequence;
    performing residual connection and normalization processing on the first intermediate encoded sequence and the historical text encoded sequence to obtain the second intermediate encoded sequence.

4. The method according to claim 1, wherein generating the synthesized speech data matched with the text input sequence based on the target text encoded sequence comprises:
    inputting the target text encoded sequence into a duration predictor, and acquiring a predicted duration sequence corresponding to the text input sequence;
    inputting the target text encoded sequence into a length regulator, and performing, in the length regulator, sequence length expansion on the target text encoded sequence according to the predicted duration sequence to obtain an expanded target text encoded sequence;

inputting the expanded target text encoded sequence into a decoder comprising N decoding layers, and generating a target speech decoded sequence;

inputting the target speech decoded sequence into a first linear layer, and linearly transforming the target speech decoded sequence in the first linear layer to obtain an acoustic feature sequence; and performing acoustic feature conversion on the acoustic feature sequence to obtain the synthesized speech data matched with the text input sequence.

5. The method according to claim 4, wherein the N decoding layers comprise a decoding layer $D_j$ and a decoding layer $D_{j+1}$, the decoding layer $D_{j+1}$ being a next decoding layer of the decoding layer $D_j$, j being a positive integer, and j being less than N; and the decoding layer $D_{j+1}$ comprising a second multi-head self-attention network; and inputting the expanded target text encoded sequence into the decoder comprising the N decoding layers, and generating the target speech decoded sequence comprise:

acquiring a third attention matrix and a historical speech decoded sequence outputted by the decoding layer $D_j$, and generating a fourth attention matrix of the decoding layer $D_{j+1}$ according to residual connection between the third attention matrix and the second multi-head self-attention network and the historical speech decoded sequence; and generating the target speech decoded sequence of the decoding layer $D_{j+1}$ according to the fourth attention matrix and the historical speech decoded sequence; when the decoding layer $D_j$ is the first decoding layer, the historical speech decoded sequence of the decoding layer $D_j$ being the expanded target text encoded sequence.

6. The method according to claim 5, wherein the second multi-head self-attention network comprises at least two second single-head self-attention networks; and acquiring the third attention matrix and the historical speech decoded sequence outputted by the decoding layer $D_j$, and generating the fourth attention matrix of the decoding layer $D_{j+1}$ according to the residual connection between the third attention matrix and the second multi-head self-attention network and the historical speech decoded sequence comprise:

acquiring the third attention matrix and the historical speech decoded sequence outputted by the decoding layer $D_j$; the historical speech decoded sequence comprising second matching matrices respectively corresponding to the at least two single-head self-attention networks;

acquiring a second mapping matrix corresponding to the second multi-head self-attention network, and generating at least two sub-attention matrices respectively corresponding to the at least two second single-head self-attention networks according to residual connection among the second mapping matrix, the second matching matrix and the third attention matrix; and concatenating the at least two sub-attention matrices to obtain the fourth attention matrix of the decoding layer $D_{j+1}$.

7. The method according to claim 5, wherein the decoding layer $D_{j+1}$ comprises a second convolutional network; and generating the target speech decoded sequence of the decoding layer $D_{j+1}$ according to the fourth attention matrix and the historical speech decoded sequence comprises:

multiplying the fourth attention matrix and the historical speech decoded sequence to obtain a first intermediate decoded sequence;

performing residual connection and normalization processing on the first intermediate decoded sequence and the historical speech decoded sequence to obtain a second intermediate decoded sequence, and inputting the second intermediate decoded sequence into the second convolutional network to obtain a third intermediate decoded sequence;

performing residual connection and normalization processing on the third intermediate decoded sequence and the second intermediate decoded sequence to obtain a current speech decoded sequence of the decoding layer $D_{j+1}$; and determining, when the current speech decoded sequence is a speech decoded sequence of the $N^{th}$ decoding layer, the current speech decoded sequence as the target speech decoded sequence.

8. The method according to claim 4, wherein the duration predictor comprises two layers of one-dimensional convolutional networks and a second linear layer; and inputting the target text encoded sequence into the duration predictor, and acquiring the predicted duration sequence corresponding to the text input sequence comprise:

inputting the target text encoded sequence into the two layers of one-dimensional convolutional networks in the duration predictor to obtain a duration feature; and inputting the duration feature into the second linear layer, and linearly transforming the duration feature through the second linear layer to obtain the predicted duration sequence corresponding to the text input sequence.

9. The method according to claim 4, wherein the target text encoded sequence comprises at least two encoded vectors; the predicted duration sequence comprising at least two duration parameters; and inputting the target text encoded sequence into the length regulator, and performing, in the length regulator, the sequence length expansion on the target text encoded sequence=comprise:

inputting the target text encoded sequence into the length regulator, and replicating, in the length regulator, the at least two encoded vectors according to the at least two duration parameters in the predicted duration sequence to obtain replicated encoded vectors; and concatenating the replicated encoded vectors with the target text encoded sequence to obtain the expanded target text encoded sequence; the sequence length of the expanded target text encoded sequence being equal to the sum of the at least two duration parameters.

10. The method according to claim 4, further comprising:

acquiring a speech regulating parameter, and updating the predicted duration sequence according to the speech regulating parameter to obtain an updated predicted duration sequence; and regulating speech rate or prosody of the synthesized speech data according to the updated predicted duration sequence.

11. The method according to claim 1, wherein converting the text input sequence into the text feature representation sequence comprises:

inputting the text input sequence into a token embedding, looking up in a vector conversion table through the token embedding, and using a feature vector matched with the text input sequence as the text feature representation sequence; the vector conversion table comprising a mapping relationship between characters or phonemes and feature vectors.

12. A computer device, comprising: a processor, a memory and a network interface;
the processor being connected to the memory and the network interface, the network interface being configured to provide a data communication function, the memory being configured to store program code, and the processor being configured to invoke the program code to perform:
converting a text input sequence into a text feature representation sequence;
inputting the text feature representation sequence into an encoder comprising N encoding layers; the N encoding layers comprising an encoding layer $E_i$ and an encoding layer $E_{i+1}$, the encoding layer $E_{i+1}$ being a next encoding layer of the encoding layer $E_i$, N being an integer greater than 1, i being a positive integer, and i being less than N; and the encoding layer $E_{i+1}$ comprising a first multi-head self-attention network and a first convolutional network;
acquiring a first attention matrix and a historical text encoded sequence outputted by the encoding layer $E_i$, and generating a second attention matrix of the encoding layer $E_{i+1}$ according to residual connection between the first attention matrix and the first multi-head self-attention network, and the historical text encoded sequence;
generating a target text encoded sequence of the encoding layer $E_{i+1}$ according to the second attention matrix and the historical text encoded sequence, comprising:
obtaining a second intermediate encoded sequence based on the second attention matrix and the historical text encoded sequence, and inputting the second intermediate encoded sequence into the first convolutional network to obtain a third intermediate encoded sequence;
performing residual connection and normalization processing on the third intermediate encoded sequence and the second intermediate encoded sequence to obtain a current text encoded sequence of the encoding layer $E_{i+1}$; and
determining, when the current text encoded sequence is a text encoded sequence of the $N^{th}$ encoding layer, the current text encoded sequence as the target text encoded sequence; and
generating synthesized speech data matched with the text input sequence based on the target text encoded sequence.

13. The device according to claim 12, wherein the first multi-head self-attention network comprises at least two first single-head self-attention networks; and
acquiring the first attention matrix and the historical text encoded sequence and generating the second attention matrix of the encoding layer $E_{i+1}$ comprise:
acquiring the first attention matrix and the historical text encoded sequence that comprises first matching matrices respectively corresponding to the at least two first single-head self-attention networks;
acquiring a first mapping matrix corresponding to the first multi-head self-attention network, and generating at least two sub-attention matrices respectively corresponding to the at least two first single-head self-attention networks according to residual connection among the first mapping matrix, the first matching matrix and the first attention matrix; and
concatenating the at least two sub-attention matrices to obtain the second attention matrix of the encoding layer $E_{i+1}$.

14. The device according to claim 12, wherein
generating the target text encoded sequence of the encoding layer $E_{i+1}$ according to the second attention matrix and the historical text encoded sequence further comprises:
multiplying the second attention matrix and the historical text encoded sequence to obtain the first intermediate encoded sequence;
performing residual connection and normalization processing on the first intermediate encoded sequence and the historical text encoded sequence to obtain the second intermediate encoded sequence.

15. The device according to claim 12, wherein generating the synthesized speech data matched with the text input sequence based on the target text encoded sequence comprises:
inputting the target text encoded sequence into a duration predictor, and acquiring a predicted duration sequence corresponding to the text input sequence;
inputting the target text encoded sequence into a length regulator, and performing, in the length regulator, sequence length expansion on the target text encoded sequence according to the predicted duration sequence to obtain an expanded target text encoded sequence;
inputting the expanded target text encoded sequence into a decoder comprising N decoding layers, and generating a target speech decoded sequence;
inputting the target speech decoded sequence into a first linear layer, and linearly transforming the target speech decoded sequence in the first linear layer to obtain an acoustic feature sequence; and
performing acoustic feature conversion on the acoustic feature sequence to obtain the synthesized speech data matched with the text input sequence.

16. The device according to claim 15, wherein the N decoding layers comprise a decoding layer $D_j$ and a decoding layer $D_{j+1}$, the decoding layer $D_{j+1}$ being a next decoding layer of the decoding layer $D_j$, j being a positive integer, and j being less than N; and the decoding layer $D_{j+1}$ comprising a second multi-head self-attention network; and
inputting the expanded target text encoded sequence into the decoder comprising the N decoding layers, and generating the target speech decoded sequence comprise:
acquiring a third attention matrix and a historical speech decoded sequence outputted by the decoding layer $D_j$, and generating a fourth attention matrix of the decoding layer $D_{j+1}$ according to residual connection between the third attention matrix and the second multi-head self-attention network and the historical speech decoded sequence; and
generating the target speech decoded sequence of the decoding layer $D_{j+1}$ according to the fourth attention matrix and the historical speech decoded sequence; when the decoding layer $D_j$ is the first decoding layer, the historical speech decoded sequence of the decoding layer $D_j$ being the expanded target text encoded sequence.

17. The device according to claim 16, wherein the second multi-head self-attention network comprises at least two second single-head self-attention networks; and acquiring the third attention matrix and the historical speech decoded sequence outputted by the decoding layer $D_j$, and generating the fourth attention matrix of the decoding layer $D_{j+1}$ according to the residual connection between the third attention matrix and the second multi-head self-attention network and the historical speech decoded sequence comprise:

acquiring the third attention matrix and the historical speech decoded sequence outputted by the decoding layer $D_j$; the historical speech decoded sequence comprising second matching matrices respectively corresponding to the at least two single-head self-attention networks;

acquiring a second mapping matrix corresponding to the second multi-head self-attention network, and generating at least two sub-attention matrices respectively corresponding to the at least two second single-head self-attention networks according to residual connection among the second mapping matrix, the second matching matrix and the third attention matrix; and concatenating the at least two sub-attention matrices to obtain the fourth attention matrix of the decoding layer $D_{j+1}$.

18. The device according to claim 16, wherein the decoding layer $D_{j+1}$ comprises a second convolutional network; and generating the target speech decoded sequence of the decoding layer $D_{j+1}$ according to the fourth attention matrix and the historical speech decoded sequence comprises:

multiplying the fourth attention matrix and the historical speech decoded sequence to obtain a first intermediate decoded sequence;

performing residual connection and normalization processing on the first intermediate decoded sequence and the historical speech decoded sequence to obtain a second intermediate decoded sequence, and inputting the second intermediate decoded sequence into the second convolutional network to obtain a third intermediate decoded sequence;

performing residual connection and normalization processing on the third intermediate decoded sequence and the second intermediate decoded sequence to obtain a current speech decoded sequence of the decoding layer $D_{j+1}$; and determining, when the current speech decoded sequence is a speech decoded sequence of the $N^{th}$ decoding layer, the current speech decoded sequence as the target speech decoded sequence.

19. The device according to claim 15, wherein the duration predictor comprises two layers of one-dimensional convolutional networks and a second linear layer; and inputting the target text encoded sequence into the duration predictor, and acquiring the predicted duration sequence corresponding to the text input sequence comprise:

inputting the target text encoded sequence into the two layers of one-dimensional convolutional networks in the duration predictor to obtain a duration feature; and inputting the duration feature into the second linear layer, and linearly transforming the duration feature through the second linear layer to obtain the predicted duration sequence corresponding to the text input sequence.

20. A non-transitory computer-readable storage medium, storing a computer program, and the computer program being adapted to be loaded and executed by a processor to perform:

converting a text input sequence into a text feature representation sequence;

inputting the text feature representation sequence into an encoder comprising N encoding layers; the N encoding layers comprising an encoding layer $E_i$ and an encoding layer $E_{i+1}$, the encoding layer $E_{i+1}$ being a next encoding layer of the encoding layer $E_i$, N being an integer greater than 1, i being a positive integer, and i being less than N; and the encoding layer $E_{i+1}$ comprising a first multi-head self-attention network and a first convolutional network;

acquiring a first attention matrix and a historical text encoded sequence outputted by the encoding layer $E_i$, and generating a second attention matrix of the encoding layer $E_{i+1}$ according to residual connection between the first attention matrix and the first multi-head self-attention network, and the historical text encoded sequence;

generating a target text encoded sequence of the encoding layer $E_{i+1}$ according to the second attention matrix and the historical text encoded sequence, comprising:

obtaining a second intermediate encoded sequence based on the second attention matrix and the historical text encoded sequence, and inputting the second intermediate encoded sequence into the first convolutional network to obtain a third intermediate encoded sequence;

performing residual connection and normalization processing on the third intermediate encoded sequence and the second intermediate encoded sequence to obtain a current text encoded sequence of the encoding layer $E_{i+1}$; and determining, when the current text encoded sequence is a text encoded sequence of the $N^{th}$ encoding layer, the current text encoded sequence as the target text encoded sequence; and generating synthesized speech data matched with the text input sequence based on the target text encoded sequence.

* * * * *